(12) United States Patent
Gu et al.

(10) Patent No.: US 11,377,211 B2
(45) Date of Patent: Jul. 5, 2022

(54) FLIGHT PATH GENERATION METHOD, FLIGHT PATH GENERATION SYSTEM, FLIGHT VEHICLE, PROGRAM, AND STORAGE MEDIUM

(71) Applicant: SZ DJI TECHNOLOGY CO., LTD., Shenzhen (CN)

(72) Inventors: Lei Gu, Tokyo (JP); Zongyao Qu, Tokyo (JP)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 452 days.

(21) Appl. No.: 16/385,501

(22) Filed: Apr. 16, 2019

(65) Prior Publication Data

US 2019/0241263 A1 Aug. 8, 2019

Related U.S. Application Data

(63) Continuation of application No. PCT/JP2016/080752, filed on Oct. 17, 2016.

(51) Int. Cl.
*B64C 39/02* (2006.01)
*G05D 1/00* (2006.01)
*G05D 1/10* (2006.01)
*B64D 47/08* (2006.01)
*H04N 7/18* (2006.01)
(Continued)

(52) U.S. Cl.
CPC ........... *B64C 39/024* (2013.01); *B64C 39/02* (2013.01); *B64D 47/08* (2013.01); *G05D 1/00* (2013.01); *G05D 1/0094* (2013.01); *G05D 1/106* (2019.05); *H04N 5/225* (2013.01); *H04N 5/232* (2013.01); *H04N 7/185* (2013.01); *B64C 2201/127* (2013.01); *B64C 2201/141* (2013.01)

(58) Field of Classification Search
CPC . B64C 39/024; B64C 39/02; B64C 2201/141; B64C 2201/127; B64C 2201/146; B64C 2201/145; G05D 1/00; G05D 1/0094; G05D 1/106; H04N 5/225; H04N 7/185; H04N 5/232; H04N 5/23299; H04N 5/23203; H04N 5/247; B64D 47/08
See application file for complete search history.

(56) References Cited

U.S. PATENT DOCUMENTS

2010/0017114 A1  1/2010  Tehan et al.
2016/0116914 A1  4/2016  Mucci
(Continued)

FOREIGN PATENT DOCUMENTS

CN   103477185 A    12/2013
CN   101095090 A    12/2017
EP   2244150 A2 *  10/2010
(Continued)

OTHER PUBLICATIONS

World Intellectual Property Organization (WIPO) International Search Report for PCT/JP2016/080752 dated Dec. 27, 2016 5 Pages.

*Primary Examiner* — Brian P Sweeney
(74) *Attorney, Agent, or Firm* — Anova Law Group, PLLC

(57) ABSTRACT

A flight path generation method includes determining a plurality of photographing positions for a flight vehicle to photograph a subject based on a flight range of the flight vehicle and photographing position intervals, and generating a flight path of the flight vehicle that passes through the photographing positions.

20 Claims, 16 Drawing Sheets

(51) Int. Cl.
      *H04N 5/232*       (2006.01)
      *H04N 5/225*       (2006.01)

(56) References Cited

U.S. PATENT DOCUMENTS

| | | | |
|---|---|---|---|
| 2016/0313736 A1* | 10/2016 | Schultz | G06T 11/60 |
| 2018/0032088 A1* | 2/2018 | van Cruyningen | G01C 11/08 |

FOREIGN PATENT DOCUMENTS

| | | | |
|---|---|---|---|
| JP | 2010061216 A | | 3/2010 |
| JP | 2014139538 A | | 7/2014 |
| JP | 2014185947 A | | 10/2014 |
| JP | 2000341672 A | | 12/2020 |
| WO | 2015163012 A1 | | 10/2015 |
| WO | 2016111595 A1 | | 7/2016 |
| WO | 2016140985 A1 | | 9/2016 |
| WO | WO 2016140985 A1 | * | 9/2016 |

* cited by examiner

FLIGHT PATH GENERATION METHOD, FLIGHT PATH GENERATION SYSTEM, FLIGHT VEHICLE, PROGRAM, AND STORAGE MEDIUM

CROSS-REFERENCE TO RELATED APPLICATION

This application is a continuation of International Application No. PCT/JP2016/080752, filed on Oct. 17, 2016, the entire content of which is incorporated herein by reference.

TECHNICAL FIELD

The present disclosure relates to a flight path generation method, a flight path generation system, a flight vehicle, a program, and a storage medium.

BACKGROUND ART

Platforms (unmanned aerial vehicles) that pick up images while travelling along a preset fixed path have been known. This platform receives a photographing instruction from a ground base and photographs a target to be photographed. When photographing the target while flying along the fixed path, the platform controls the posture of a photographing apparatus thereof to be tilted according to a positional relationship between the platform and the target and to photograph the target.

PRIOR ART DOCUMENT

Patent Document

Patent Document 1: JP-A-2010-61216

SUMMARY OF THE DISCLOSURE

Problems to be Solved

The platform described in Patent Document 1 performs photographing while traveling along a fixed path. The existence of a specific subject (for example, a building) located in a direction perpendicular to the fixed path is however not sufficiently considered. Therefore, it is difficult to sufficiently acquire a photographed image of the side surface of a specific subject.

When a side surface of a specific object is photographed, it is conceivable that a photographer holds a photographing device and photographs the side surface of the subject. In this case, the user needs to move to the periphery of the subject, which may lead inconvenience to the user. In addition, since the user manually photographs an object in this case, it may be difficult to sufficiently acquire a photographed image in a desired state (for example, a desired photographing position of the subject, a desired photographing size of the subject, a desired photographing direction of the subject).

In addition, when the side surface of a specific subject is photographed by an unmanned aerial vehicle, it may be conceivable to determine a flight path of the unmanned aerial vehicle. When a desired position around the subject is designated as a photographing position, it is conceivable to designate a three-dimensional spacial position (latitude, longitude, altitude) by user input. In this case, since each photographing position must be determined by user input, which may lead inconvenience to a user.

Means for Solving the Problems

In one aspect, a flight path generation method for a flight vehicle that photographs a subject while traveling around a side of the subject, includes the steps of: determining a photographing position for the flight vehicle to photograph the subject on the basis of a flight range of the flight vehicle and photographing position intervals that are intervals between positions at which the subject is photographed with the flight vehicle; and generating a flight path of the flight vehicle such that the flight path passes through the photographing position.

The photographing position intervals may include a first photographing position intervals which are intervals between photographing positions of the subject at a same altitude.

The flight path generation method may further include a step of determining the first photographing position intervals on the basis of at least one of a radius of the subject, a radius of the flight range, a field of view of a photographing unit mounted on the flight vehicle, or a first overlap rate which is an overlap rate between photography ranges photographed with the flight vehicle at adjacent photographing positions.

The first photographing position intervals may be set such that each of the first photographing position intervals in the flight path should be equal in length.

The photographing position intervals may include second photographing position intervals which are intervals in photographing altitudes for photographing the subject by the flight vehicle.

The flight path generation method may further include a step of determining the second photographing position intervals on the basis of at least one of a radius of the subject, a radius of the flight range, a field of view of a photographing unit mounted on the flight vehicle, or a second overlap rate which is an overlap rate between the photography ranges photographed by the flight vehicle at adjacent photographing altitudes.

The second photographing position intervals may be set such that each of the second photographing position intervals in the flight path should be equal in length.

The flight path may be a flight path that shifts altitudes thereof from the first altitude to the second altitude after the flight vehicle passes through each photographing position at the first altitude.

The flight path generation method may further include a step of photographing a side surface of the subject with the flight vehicle at each photographing position in the flight path to acquire a plurality of photographed images.

The flight path generation method may further include a step of photographing a side surface of the subject with the flight vehicle so as to partially overlap photography ranges each photographed at each photographing position in the flight path to acquire a plurality of photographed images.

The flight path generation method may further include a step of generating three-dimensional shape data of the subject on the basis of the plurality of photographed images.

In one aspect, a flight path generation system for generating a flight path for a flight vehicle that photographs a subject while traveling around a side of the subject, includes a processing unit for determining a photographing position for the flight vehicle to photograph the subject on the basis of a flight range of the flight vehicle and photographing position intervals that are intervals between positions at which the subject is photographed by the flight vehicle and generating a flight path of the flight vehicle such that the flight path passes through the photographing position.

The photographing position intervals may include first photographing position intervals which are intervals between the photographing positions of the subject at a same altitude.

The processing unit may determine the first photographing position intervals on the basis of at least one of a radius of the subject, a radius of the flight range, a field of view of a photographing unit mounted on the flight vehicle, or a first overlap rate which is an overlap rate between photography ranges photographed by the flight vehicle at adjacent photographing positions.

The first photographing position intervals may be set such that each of the first photographing position intervals in the flight path should be equal in length.

The photographing position intervals may include second photographing position intervals which are intervals in photographing altitudes for photographing the subject by the flight vehicle.

The processing unit may determine the second photographing position intervals on the basis of at least one of a radius of the subject, a radius of the flight range, a field of view of a photographing unit mounted on the flight vehicle, or a second overlap rate which is an overlap rate between photography ranges photographed by the flight vehicle at adjacent photographing altitudes.

The second photographing position intervals may be set such that each of the second photographing position intervals in the flight path should be equal in length.

The flight path may be a flight path that shifts altitudes thereof from the first altitude to the second altitude after the flight vehicle passes through each photographing position at the first altitude.

The flight path generation system may further include a photographing unit for photographing a side surface of the subject with the flight vehicle at each photographing position in the flight path to acquire a plurality of photographed images.

The flight path generation system may further include a photographing unit for photographing a side surface of the subject with the flight vehicle so as to partially overlap photography ranges each photographed at each photographing position in the flight path to acquire a plurality of photographed images.

The processing unit may generate three-dimensional shape data of the subject on the basis of the plurality of photographed images.

In one aspect, a flight vehicle for photographing a subject while traveling around a side of the subject, includes a processing unit for determining a photographing position to photograph the subject on the basis of a flight range of the flight vehicle and photographing position intervals that are intervals between positions at which the subject is photographed and generating a flight path of the flight vehicle such that the flight path passes through the photographing position.

The photographing position intervals may include first photographing position intervals which are the intervals of the photographing position of the subject at a same altitude.

The processing unit may determine the first photographing position intervals on the basis of at least one of a radius of the subject, a radius of the flight range, a field of view of a photographing unit mounted on the flight vehicle, or a first overlap rate which is an overlap rate between the photography ranges photographed by the flight vehicle at adjacent photographing positions.

The first photographing position intervals may be set such that each of the first photographing position intervals in the flight path should be equal in length.

The photographing position intervals may include second photographing position intervals which are intervals in photographing altitudes for photographing the subject by the flight vehicle.

The processing unit may determine the second photographing position intervals on the basis of at least one of a radius of the subject, a radius of the flight range, a field of view of a photographing unit mounted on the flight vehicle, or a second overlap rate which is an overlap rate between the photography ranges photographed by the flight vehicle at adjacent photographing altitudes.

The second photographing position intervals may be set such that each of the second photographing position intervals in the flight path should be equal in length.

The flight path may be a flight path that shifts altitudes thereof from the first altitude to the second altitude after the flight vehicle passes through each photographing position at the first altitude.

The flight vehicle may further include a photographing unit for photographing a side surface of the subject at each photographing position in the flight path to acquire a plurality of photographed images.

The flight vehicle may further include a photographing unit for photographing a side surface of the subject so as to partially overlap photography ranges each photographed at each photographing position in the flight path to acquire a plurality of photographed images.

The processing unit may generate three-dimensional shape data of the subject on the basis of the plurality of photographed images.

The processing unit may acquire parameters which include at least one of the following: information about a radius of the subject, information about a radius of the flight range, information about a first overlap rate which is an overlap rate between the photography ranges photographed by the flight vehicle at adjacent photographing positions, or information about a second overlap rate which is an overlap rate between the photography ranges photographed by the flight vehicle at adjacent photographing altitudes.

In one aspect, a program is for executing the following steps in a computer used for generating a flight path for a flight vehicle for photographing a subject while traveling around a side of the subject: a step of determining a photographing position for the flight vehicle to photograph the subject on the basis of a flight range of the flight vehicle and a photographing position intervals that are intervals between positions at which the subject is photographed by the flight vehicle and a step of generating a flight path of the flight vehicle such that the flight path passes through the photographing position.

In one aspect, a storage medium is a computer-readable storage medium for recording a program which executes the following steps in a computer used for generating a flight path for a flight vehicle for photographing a subject while traveling around a side of the subject: a step of determining a photographing position for the flight vehicle to photograph the subject on the basis of a flight range of the flight vehicle and photographing position intervals that are intervals between positions at which the subject is photographed by the flight vehicle and a step of generating a flight path of the flight vehicle such that the flight path passes through the photographing position.

Note that the above summary of the disclosure does not enumerate all the features of the present disclosure. Subcombinations of groups of the above features may also constitute part of the present disclosure.

DESCRIPTION OF EMBODIMENTS

Figure 1:
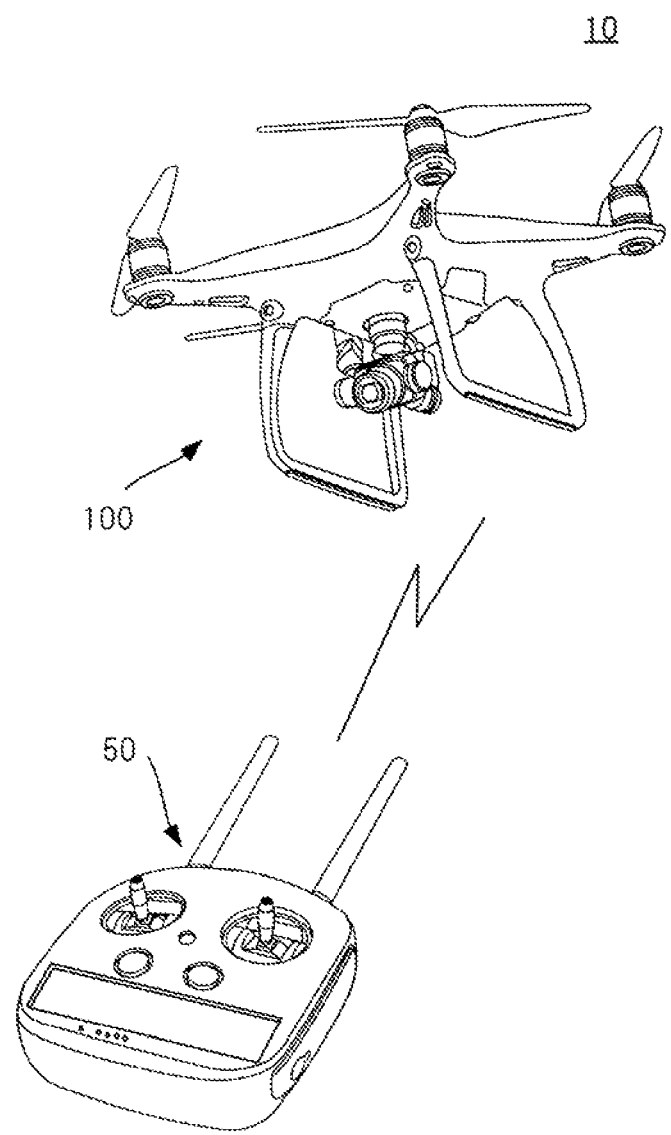
FIG. 1 is a schematic diagram showing an example of the configuration of a flight path generation system according to one embodiment.

Hereinafter, the present disclosure will be described with reference to embodiments of the present disclosure, but the following embodiments are not intended to limit the disclosure recited in claims. None of the combinations of features described in the embodiments are necessarily indispensable for the solution means of the disclosure.

In the following embodiments, the flight vehicle is exemplified by an unmanned aerial vehicle (UAV). In the drawings of the description, the unmanned aerial vehicle is referred to as a "UAV". A flight path generation method defines operations of the flight path generation system. In addition, a storage medium is a storage medium which records a program (for example, a program that makes at least one of an unmanned aerial vehicle or a transmitter execute various processes).

FIG. 1 is a schematic diagram showing an example of the configuration of a flight path generation system 10 according to one embodiment. The flight path generation system 10 includes an unmanned aerial vehicle 100 and a transmitter 50. The unmanned aerial vehicle 100 and the transmitter 50 can communicate with each other by means of wired communication or wireless communication (for example, a wireless local area network (LAN) and Bluetooth (a registered trademark)).

Figure 2:
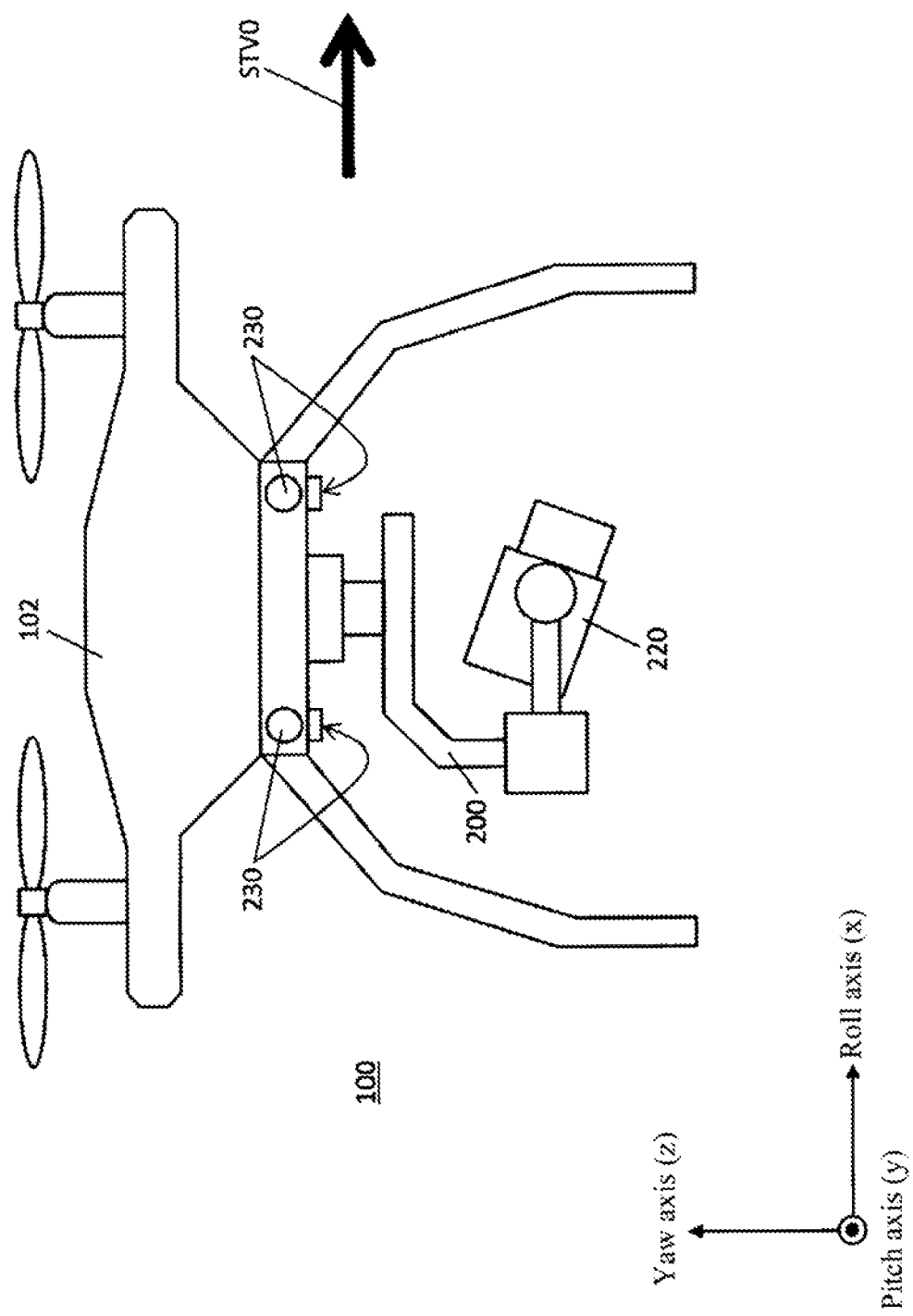
FIG. 2 is a diagram showing an example of an appearance of an unmanned aerial vehicle.
Figure 3:
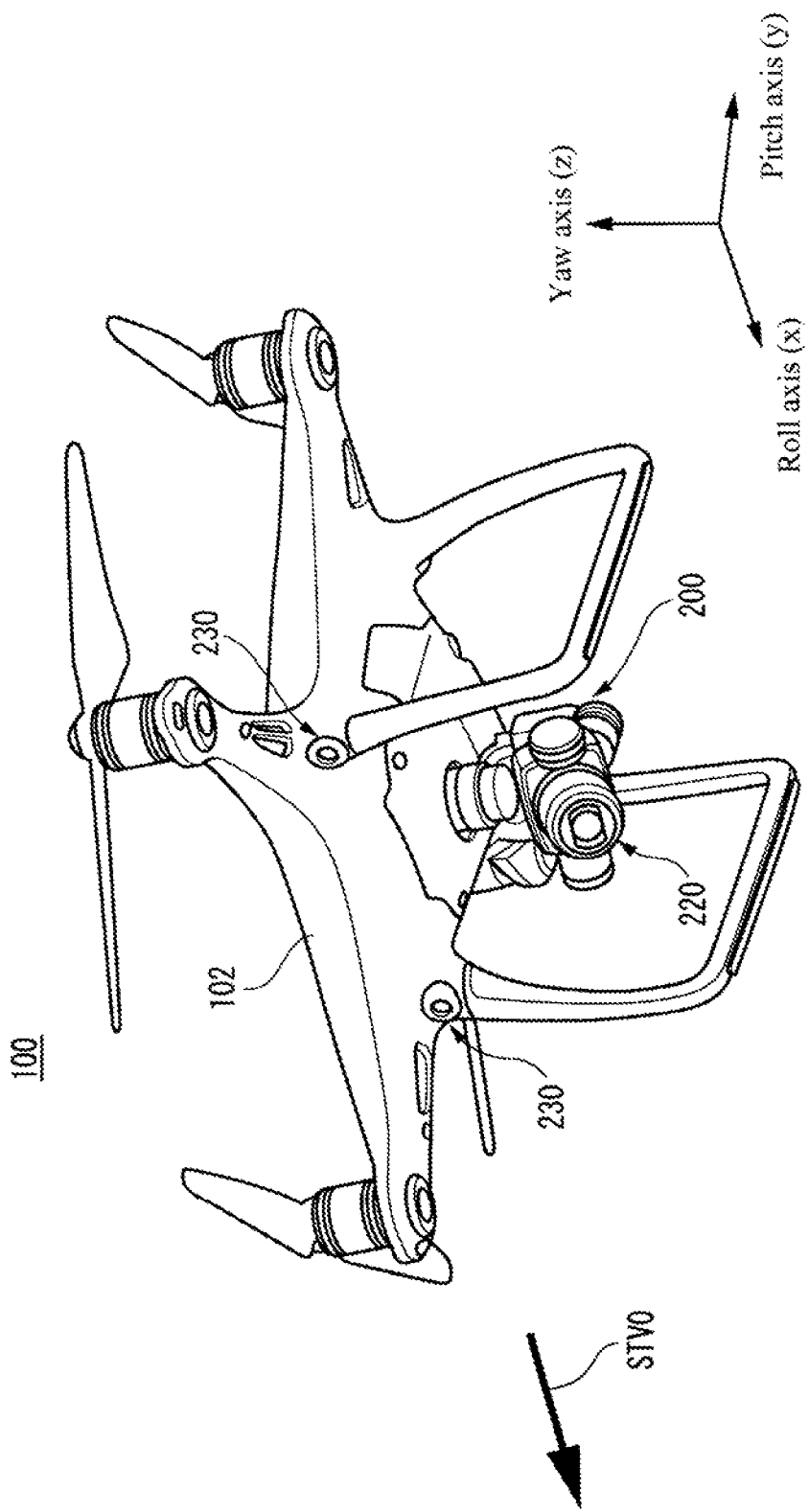
FIG. 3 is a diagram showing an example of a specific appearance of an unmanned aerial vehicle.

First, an example of the configuration of the unmanned aerial vehicle 100 will be described. FIG. 2 is a diagram showing an example of an appearance of an unmanned aerial vehicle 100. FIG. 3 is a diagram showing an example of a specific appearance of an unmanned aerial vehicle 100. A side view of the unmanned aerial vehicle 100 flying in the moving direction STV0 is shown in FIG. 2, and a perspective view of the unmanned aerial vehicle 100 flying in the moving direction STV0 is shown in FIG. 3.

As shown in FIGS. 2 and 3, the roll axis (see the x axis) is defined in a direction as parallel to the ground and along the moving direction STV0. In this case, the pitch axis (see the y axis) is defined in a direction parallel to the ground and perpendicular to the roll axis, furthermore, the yaw axis (see z axis) is defined in a direction perpendicular to the ground and perpendicular to the roll axis and the pitch axis.

The unmanned aerial vehicle 100 is configured to include a UAV main body 102, a gimbal 200, a photographing device 220, and a plurality of photographing devices 230. The unmanned aerial vehicle 100 is an example of a flight vehicle. The photographing devices 220 and 230 are examples of photographing units.

The UAV main body 102 includes a plurality of rotary wings. The UAV main body 102 makes the unmanned aerial vehicle 100 fly by controlling the rotation of the plurality of rotary wings. The UAV main body 102, for example, uses four rotary wings to fly the unmanned aerial vehicle 100. The number of rotary wings is not limited to four. In addition, the unmanned aerial vehicle 100 may be a fixed wing machine without rotary wings.

The photographing device 220 is a camera for photographing a subject (for example, an aerial view of the sky, scenery of mountains and rivers, and buildings on the ground) within a desired photography range.

The plurality of photographing devices 230 are sensing cameras for photographing surroundings of the unmanned aerial vehicle 100 in order to control the flight of the unmanned aerial vehicle 100. Two photographing devices 230 may be provided on a front surface, i.e., a nose, of the unmanned aerial vehicle 100. Furthermore, another two photographing devices 230 may be provided on a bottom surface of the unmanned aerial vehicle 100. The two photographing devices 230 on the front side are paired and may function as a so-called stereo camera. The two photographing devices 230 on the bottom side are also paired and may function as a so-called stereo camera. On the basis of images imaged by the plurality of photographing devices 230, three-dimensional spatial data around the unmanned aerial vehicle 100 may be generated. Note that the number of photographing devices 230 included in the unmanned aerial vehicle 100 is not limited to four. The unmanned aerial vehicle 100 may be provided with at least one photographing device 230. The unmanned aerial vehicle 100 may include at least one photographing device 230 on the nose, a tail, a side surface, the bottom surface, and a ceiling surface of the unmanned aerial vehicle 100 separately. A field of view that can be set by the photographing devices 230 may be larger than the field of view that can be set by the photographing device 220. The photographing device 230 may include a single focus lens or a fisheye lens.

Figure 4:
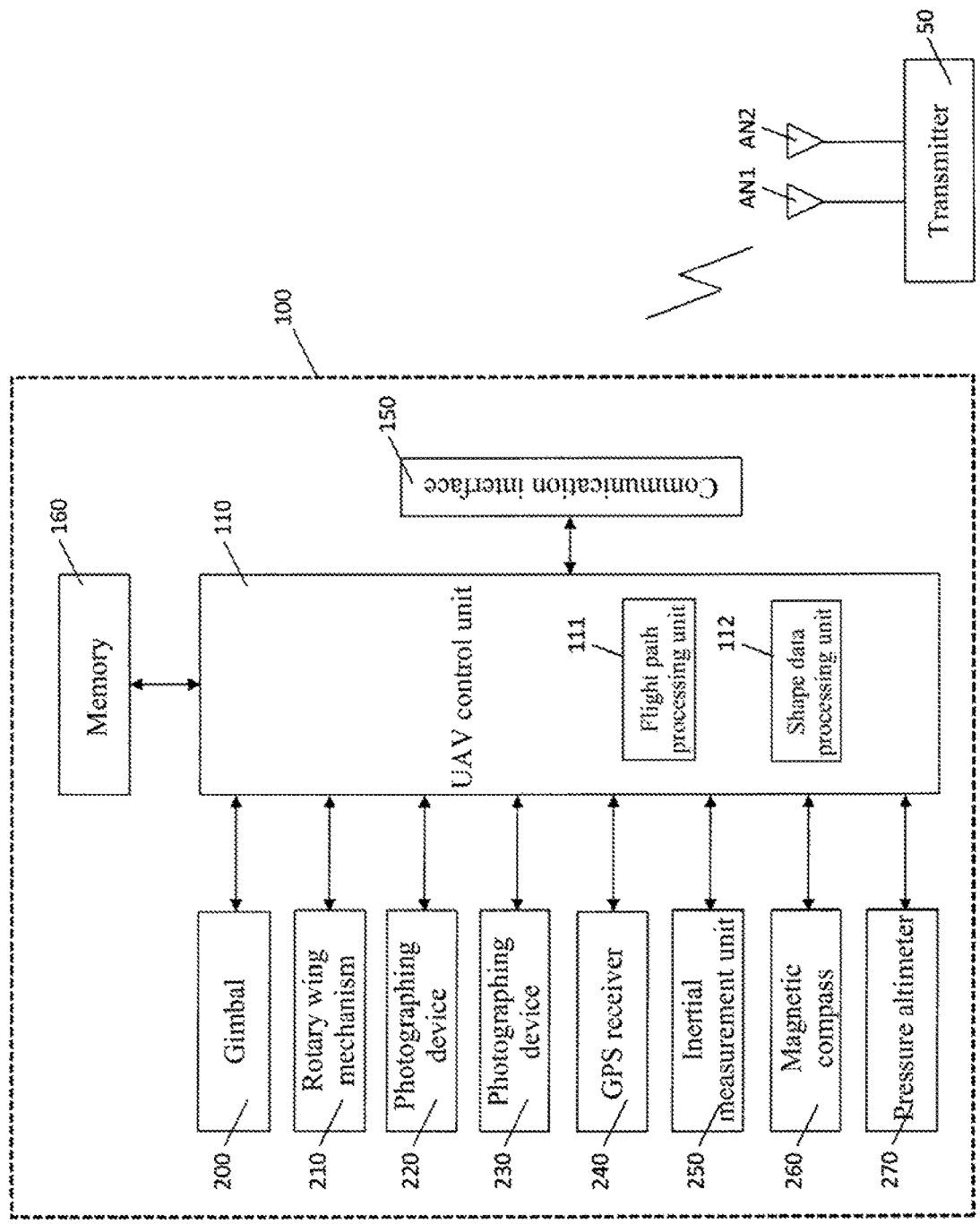
FIG. 4 is a block diagram showing an example of the hardware configuration of an unmanned aerial vehicle.

FIG. 4 is a block diagram illustrating an example of the hardware configuration of the unmanned aerial vehicle 100. The unmanned aerial vehicle 100 includes a UAV control unit 110, a communication interface 150, a memory 160, a gimbal 200, a rotary wing mechanism 210, a photographing device 220, a photographing device 230, a GPS receiver 240, an inertial measurement unit (IMU) 250, a magnetic compass 260, and a pressure altimeter 270. The UAV control unit 110 is an example of a processing unit. The communication interface 150 is an example of a communication unit.

The UAV control unit 110 is configured using, for example, a central processing unit (CPU), a micro processing unit (MPU) or a digital signal processor (DSP). The UAV control unit 110 carries out signal processing for integrating and controlling operations of each unit of the unmanned aerial vehicle 100, the input/output processing of data with other units, data arithmetic processing and data storage processing.

The UAV control unit 110 controls the flight of the unmanned aerial vehicle 100 according to a program stored in the memory 160. The UAV control unit 110 controls the flight of the unmanned aerial vehicle 100 according to a command received from the remote transmitter 50 via the communication interface 150. The memory 160 may be removable from the unmanned aerial vehicle 100.

The UAV control unit 110 may specify the surrounding environment of the unmanned aerial vehicle 100 by analyzing multiple images captured by the multiple photographing devices 230. The UAV control unit 110 controls the flight to avoid, for example, obstacles on the basis of the surrounding environment of the unmanned aerial vehicle 100.

The UAV control unit 110 acquires date and time information indicating the current date and time. The UAV control unit 110 may acquire date information indicating the current date and time from a GPS receiver 240. The UAV control unit 110 may acquire date information indicating the current date and time from a timer (not shown) mounted on the unmanned aerial vehicle 100.

The UAV control unit 110 acquires position information indicating the position of the unmanned aerial vehicle 100. The UAV control unit 110 may acquire, from the GPS receiver 240, position information indicating the latitude, longitude and altitude where the unmanned aerial vehicle 100 is located. The UAV control unit 110 may acquire, from the GPS receiver 240, latitude and longitude information indicating the latitude and longitude where the unmanned aerial vehicle 100 is located, and may acquire, from the pressure altimeter 270, altitude information indicating the altitude where the unmanned aerial vehicle 100 is located, as the position information.

The UAV control unit 110 acquires, from the magnetic compass 260, orientation information indicating the orientation of the unmanned aerial vehicle 100. For example, an orientation corresponding to the orientation of the nose of the unmanned aerial vehicle 100 is indicated in the orientation information.

The UAV control unit 110 may acquire position information indicating a position where the unmanned aerial vehicle 100 is to be located when the photographing device 220 photographs a photography range to be photographed. The UAV control unit 110 may acquire position information indicating the position to which the unmanned aerial vehicle 100 is to be located from the memory 160. The UAV control unit 110 may acquire position information indicating the position where the unmanned aerial vehicle 100 is to be located from another device such as the transmitter 50 via the communication interface 150. The UAV control unit 110 may refer to a three-dimensional map database to specify the position where the unmanned aerial vehicle 100 can be located in order to photograph the photography range to be photographed, and acquire such a position as position information indicating the position where the unmanned aerial vehicle 100 is to be located.

The UAV control unit 110 acquires photography information indicating each of the photography ranges of the photographing device 220 and the photographing device 230. The UAV control unit 110 acquires, from the photographing device 220 and the photographing device 230, a field of view information indicating the angles of view of the photographing device 220 and the photographing device 230, which acts as parameters for specifying the photography ranges. The UAV control unit 110 acquires information indicating photography directions of the photographing device 220 and the photographing device 230, which acts parameters for specifying the photography ranges. The UAV control unit 110 acquires, from the gimbal 200, posture information indicating the state of posture of the photographing device 220, which acts as information indicating the photography direction of the photographing device 220, for example. The UAV control unit 110 acquires information indicating the orientation of the unmanned aerial vehicle 100. The information indicating the state of posture of the photographing device 220 indicates a rotation angle from a reference rotation angle of a pitch axis and a yaw axis of the gimbal 200. The UAV control unit 110 acquires the position information indicating the position where the unmanned aerial vehicle 100 is located, which acts as a parameter for specifying the photography range. The UAV control unit 110 may acquire photography information by defining a photography range indicating a geographical range captured by the photographing device 220 and by generating photography information indicating the photography range on the basis of the field of views and the photography directions of the photographing device 220 and the photographing device 230, as well as the position of the unmanned aerial vehicle 100.

The UAV control unit 110 may acquire photography information indicating the photography range to be photographed by the photographing device 220. The UAV control unit 110 may acquire photography information to be photographed by the photographing device 220 from the memory 160. The UAV control unit 110 may acquire photography information to be photographed by the photographing device 220 from another device such as the transmitter 50 via the communication interface 150.

The UAV control unit 110 may acquire stereoscopic information (three-dimensional information) indicating the stereoscopic shape (three-dimensional shape) of an object existing around the unmanned aerial vehicle 100. The object is, for example, a part of a landscape of a building, a road, a car, a tree, and the like. The stereoscopic information is, for example, three-dimensional space data. The UAV control unit 110 may acquire stereoscopic information by generating stereoscopic information indicating the three-dimensional shape of an object existing around the unmanned aerial vehicle 100 from each of the images obtained from the plurality of photographing devices 230. The UAV control unit 110 may acquire stereoscopic information indicating the stereoscopic shape of an object existing around the unmanned aerial vehicle 100 by referring to a three-dimensional map database stored in the memory 160. The UAV control unit 110 may acquire stereoscopic information related to the stereoscopic shape of an object existing around the unmanned aerial vehicle 100 by referring to a three-dimensional map database managed by a server existing on the network.

The UAV control unit 110 acquires image data photographed by the photographing device 220 and the photographing device 230.

The UAV control unit 110 controls the gimbal 200, the rotary wing mechanism 210, the photographing device 220, and the photographing device 230. The UAV control unit 110 controls the photography range of the photographing device 220 by changing the photography direction and a field of view of the photographing device 220. The UAV control unit 110 controls the photography range of the photographing device 220 supported by the gimbal 200 by controlling a rotation mechanism of the gimbal 200.

In the description of the present application, the photography range refers to a geographical range photographed by the photographing device 220 or the photographing device 230. The photography range is defined by a latitude, a longitude, and an altitude. The photography range may be a range in three-dimensional spatial data defined by a latitude, a longitude, and an altitude. The photography range is identified on the basis of the field of view and photography direction of the photographing device 220 or the photographing device 230 and the position where the unmanned aerial vehicle 100 is located. The photography direction of the photographing device 220 or the photographing device 230 is defined as an orientation, where the front in which a photography lens of the photographing device 220 or the photographing device 230 is provided, and a depression angle. The photography direction of the photographing device 220 is a direction identified on the basis of the orientation of the nose of the unmanned aerial vehicle 100 and the state of posture of the photographing device 220 with respect to the gimbal 200. The photography direction of the photographing device 230 is a direction identified on the basis of the orientation of the nose of the unmanned aerial vehicle 100 and the position where the photographing device 230 is located.

The UAV control unit 110 controls the flight of the unmanned aerial vehicle 100 by controlling the rotary wing mechanism 210. That is, The UAV control unit 110 controls the rotary wing mechanism 210 to control the position including the latitude, longitude and altitude of the unmanned aerial vehicle 100. The UAV control unit 110 may control the flight of the unmanned aerial vehicle 100 to control the photography range of the photographing device 220 and the photographing device 230. The UAV control unit 110 may control the field of view of the photographing device 220 by controlling the zoom lens of the photographing device 220. The UAV control unit 110 may control the field of view of the photographing device 220 by digital zoom using the digital zoom function of the photographing device 220.

If the photographing device 220 is fixed to the unmanned aerial vehicle 100 and the photographing device 220 is not allowed to move, the UAV control unit 110 can make photographing device 220 photograph a desired photography range in a desired environment by moving the unmanned aerial vehicle 100 at a particular position on a particular date and at a particular time. Alternatively, even if the photographing device 220 does not have a zoom function and cannot change the field of view of the photographing device 220, the UAV control unit 110 can make photographing device 220 photograph a desired photography range in a desired environment by moving the unmanned aerial vehicle 100 at a particular position on a particular date and at a particular time.

In addition, the UAV control unit 110 includes a function as a flight path processing unit 111 for carrying out a process related to the flight path generation. The UAV control unit 110 may include a function as a shape data processing unit 112 for carrying out a process related to the three-dimensional shape data.

The flight path processing unit 111 may acquire input parameters. Or, the flight path processing unit 111 may acquire the input parameters input by the transmitter 50 via the communication interface 150. The acquired input parameters may be stored in the memory 160. The input parameters include the photographing position (aerial photography position) (Waypoint) of the image by the unmanned aerial vehicle 100 and various parameters for generating a flight path through the photographing position. The photographing position is a position in three-dimensional space.

The input parameters include at least one of the flight range information, the information about the radius of the flight range (the radius of the flight path), the information about the center position of the flight range, the information about the radius of the subject, the height of the subject, information about the overlap rate between the photography ranges, or the resolution information about the photographing device 220 or the photographing device 230. In addition, the input parameters may also include at least one of information about the initial altitude of the flight path, information about the end altitude of the flight path, or information about the initial photographing position of the flight course. In addition, the input parameters may include information about the photographing position intervals.

In addition, the flight path processing unit 111 may acquire at least part of the information included in the input parameter from another device instead of acquiring it from the transmitter 50. For example, the flight path processing unit 111 may receive and acquire the identification information about the subject identified by the transmitter 50. The flight path processing unit 111 may communicate with the external server via the communication interface 150 on the basis of the identification information about the identified subject, and may receive and acquire the information about the radius of the subject and the height of the subject corresponding to the identification information about the subject.

The overlapping rate of the photography range indicates the overlap rate between the two image photography ranges when the photographing device 220 or the photographing device 230 photographs an image at adjacent photographing positions in the horizontal direction or the vertical direction. The overlap rate between the photography ranges may include at least one of the information about the overlap rate (also referred to as horizontal overlap rate) of the photography range in the horizontal direction, or the information about the overlap rate (also referred to as the vertical overlap rate) in the vertical direction. The horizontal overlap rate and the vertical overlap rate may be the same or different. When the horizontal overlap rate and the vertical overlap rate are different values, both the information about the horizontal overlap rate and the information about the vertical overlap rate may be included in the input parameters. When the horizontal overlap rate and the vertical overlap rate are of the same value, the information about one overlap rate which is of the same value may be included in the input parameters. The horizontal overlap rate is an example of the first overlap rate. The vertical overlap rate is an example of the second overlap rate.

The photographing position intervals are spatial photographing intervals and are distances between adjacent photographing positions among a plurality of photographing positions where the unmanned aerial vehicle 100 should photograph the image in the flight path. The photographing position intervals may include at least one of intervals between photographing positions in a horizontal direction (also referred to as horizontal photographing intervals) or intervals between photographing positions in a vertical direction (also referred to as vertical photographing intervals). The horizontal photographing intervals represent an example of the first photographing position intervals. The vertical photographing intervals represent an example of the second photographing position intervals. The flight path processing unit 111 can acquire photographing position intervals including horizontal photographing intervals and vertical photographing intervals by calculation, or can acquired same by same being included in input parameters.

The flight range is a range including a flight path in which the unmanned aerial vehicle 100 travels and fly around the subject in the peripheral end unit thereof. The flight range may be in the range in which the cross-sectional shape viewed from the top of the flight range is approximated to the circular shape. The cross-sectional shape of the flight range viewed from directly above may be a shape other than a circle (for example, a polygonal shape). The flight path may have multiple flight courses with different altitudes (photographing altitude). The flight path processing unit 111 may calculate the flight range on the basis of the information about the center position of the subject (for example, information about latitude and longitude) and the information about the radius of the subject. The flight path processing unit 111 may calculate the flight range by approximating the subject to a circle on the basis of the center position of the subject and the radius of the subject. In addition, the flight path processing unit 111 may acquire information about the flight range generated by the transmitter 50 included in the input parameters.

The flight path processing unit 111 may acquire information about the field of view of the photographing device 220 or the field of view of the photographing device 230 from the photographing device 220 or the photographing device 230. The field of view of the photographing device 220 or the field of view of the photographing device 230 may be the same or different in the horizontal direction and the vertical direction. The field of view of the photographing device 220 or the field of view of the photographing device 230 in the horizontal direction is also referred to as a horizontal field of view. The field of view of the photographing device 220 in the vertical direction or the field of view of the photographing device 230 is also referred to as a vertical field of view. When the horizontal field of view and the vertical field of view are of the same value, the flight path processing unit 111 may acquire the information of one field of view that is of the same value.

The flight path processing unit 111 may calculate the horizontal photographing intervals on the basis of the radius of the subject, the radius of the flight range, the horizontal field of view of the photographing device 220, the horizontal field of view of the photographing device 230, and the horizontal overlap rate between the photography ranges. The flight path processing unit 111 may calculate the vertical photographing intervals on the basis of the radius of the subject, the radius of the flight range, the vertical field of view of the photographing device 220, the vertical field of view of the photographing device 230, and the vertical overlap rate between the photography ranges.

The flight path processing unit 111 determines the photographing position (Waypoint) of the subject by the unmanned aerial vehicle 100 on the basis of the flight range and the photographing position intervals. The photographing positions by the unmanned aerial vehicle 100 may be arranged at equal intervals in the horizontal direction and the distances between the last photographing position and the first photographing position may be shorter than the photographing position intervals. These intervals are the horizontal photographing intervals. The photographing positions by the unmanned aerial vehicle 100 may be arranged at equal intervals in the vertical direction and the distances between the last photographing position and the first photographing position may be shorter than the photographing position intervals. These intervals are the vertical photographing intervals.

The flight path processing unit 111 generates a flight path passing through the determined photographing position. The flight path processing unit 111 may generate a flight path in which each of the photographing positions adjacent in the horizontal direction is sequentially passed through in one flight path, and all of the photographing positions in the flight path are passed in the next flight path. Likewise, the flight path processing unit 111 may generate a flight path in which each of the photographing positions adjacent in the horizontal direction is sequentially passed through in a next flight path, and all of the photographing positions in the flight path are passed in the next flight path. The flight path may be formed such that the altitude increases as it proceeds from the ground side to the flight path. The flight path may be formed such that the altitude decreases as it proceeds from the aerial side to the flight path.

The flight path processing unit 111 may control the flight of the unmanned aerial vehicle 100 according to the generated flight path. The flight path processing unit 111 may make the photographing device 220 or the photographing device 230 to photograph an image of a subject at a photographing position existing in the middle of the flight path. The unmanned aerial vehicle 100 may circle the side of the subject and follow the flight path. Therefore, the photographing device 220 or the photographing device 230 may photograph the side surface of the subject at the photographing position in the flight path. The photographed image photographed by the photographing device 220 or the photographing device 230 may be stored in the memory 160. The UAV control unit 110 may refer to the memory 160 as appropriate (for example, when generating three-dimensional shape data).

The shape data processing unit 112 may generate stereoscopic information (three-dimensional information, three-dimensional shape data) indicating the solid shape (three-dimensional shape) of an object (subject) on the basis of a plurality of photographed images photographed at different photographing positions on the basis of either of the photographing devices 220 and 230. Therefore, the photographed image may be used as one image for restoring the three-dimensional shape data. The photographed image for restoring the three-dimensional shape data may be a still image. As a method of generating three-dimensional shape data on the basis of a plurality of photographed images, a known method may be used. Examples of known methods include MVS (Multi View Stereo), PMVS (Patch-based MVS), and SfM (Structure from Motion).

The photographed image to be used for generating three-dimensional shape data may be a still image. The plurality of photographed images used for generating the three-dimensional shape data include two photographed images in which the photography ranges partially overlap each other. When three-dimensional shape data is generated in the same range as the overlap rate (that is, the overlap rate between the photography ranges) is higher, the number of photographed images used for generating the three-dimensional shape data increases. Therefore, the shape data processing unit 112 can improve the restoration accuracy of the three-dimensional shape. On the other hand, when three-dimensional shape data is generated in the same range as the overlap rate between the photography ranges is lower, the number of photographed images used for generating the three-dimensional shape data is reduced. Therefore, the shape data processing unit 112 can shorten the generation time of the three-dimensional shape data. Still, in a plurality of photographed images, two photographed images in which the photography ranges partly overlap each other may not be included.

The shape data processing unit 112 acquires, as a plurality of photographed images, a photographed image included by photographing the side surface of the subject. Therefore, the shape data processing unit 112 can collect many image features on the side surface of the subject, and can improve the restoration accuracy of the three-dimensional shape around the subject, rather than acquiring the photographed image that is uniformly photographed in the perpendicular direction from the upper space.

The communication interface 150 communicates with the transmitter 50 (see FIG. 4). The communication interface 150 receives various instructions and information from the remote transmitter 50 regarding the UAV control unit 110.

The memory 160 stores programs or the like necessary for the UAV control unit 110 to control the gimbal 200, the rotary wing mechanism 210, the photographing device 220, the photographing device 230, the GPS receiver 240, the inertial measurement unit 250, the magnetic compass 260, and the pressure altimeter 270. In addition, in the memory 160, the UAV control unit 110 stores programs and the like necessary for executing the flight path processing unit 111 and the shape data processing unit 112. The memory 160 may be a computer-readable storage medium, and may include at least one of a static random access memory (SRAM), a dynamic random access memory (DRAM), an erasable programmable read-only memory (EPROM), an electrically erasable programmable read-only memory (EEPROM), or a flash memory such as a USB memory. The memory 160 may be provided in the UAV main body 102. The memory may be detachably provided from the UAV main body 102.

The gimbal 200 supports the photographing device 220 rotatably around at least one axis. The gimbal 200 may support the photographing device 220 such that same can rotate around the yaw axis, the pitch axis, and the roll axis. The gimbal 200 causes the photographing device 220 to rotate around the center of at least one of the yaw axis, the pitch axis, or the roll axis, and thus, the photography direction of the photographing device 220 may be changed.

The rotary wing mechanism 210 includes multiple rotary wings and multiple drive motors for circling the multiple rotary wings.

The photographing device 220 photographs an image of a subject in a desired photography range and generates data of the photographed image. The image data acquired by the photography of the photographing device 220 is stored in a memory of the photographing device 220 or the memory 160.

The photographing device 230 photographs the surroundings of the unmanned aerial vehicle 100 and generates data of the photographed image. The image data from the photographing device 230 is stored in the memory 160.

The GPS receiver 240 receives a plurality of signals indicating time points when a plurality of navigation satellites (i.e., GPS satellites) send signals, and the positions (coordinates) of the GPS satellites. The GPS receiver 240 calculates, on the basis of the received plurality of signals, the position of the GPS receiver 240 (i.e., the position of the unmanned aerial vehicle 100). The GPS receiver 240 outputs the position information about the unmanned aerial vehicle 100 to the UAV control unit 110. Note that the calculation of the position information by the GPS receiver 240 may be carried out by the UAV control unit 110 instead of the GPS receiver 240. In this case, the time points included in the plurality of signals received by the GPS receiver 240 and the positions of the GPS satellites are input into the UAV control unit 110.

The inertial measurement unit 250 detects the posture of the unmanned aerial vehicle 100 and outputs the detection result to the UAV control unit 110. The inertial measurement unit IMU 250 detects accelerations in three axial directions, i.e., the front-rear, left-right, and vertical directions, and angular velocities in three axial directions, i.e., the pitch axis, the roll axis, and the yaw axis, of the unmanned aerial vehicle 100 to be the posture of the unmanned aerial vehicle 100.

The magnetic compass 260 detects the orientation of the nose of the unmanned aerial vehicle 100, and outputs the detection result to the UAV control unit 110.

The pressure altimeter 270 detects the flight altitude of the unmanned aerial vehicle 100 and outputs the detection result to the UAV control unit 110.

Figure 5:
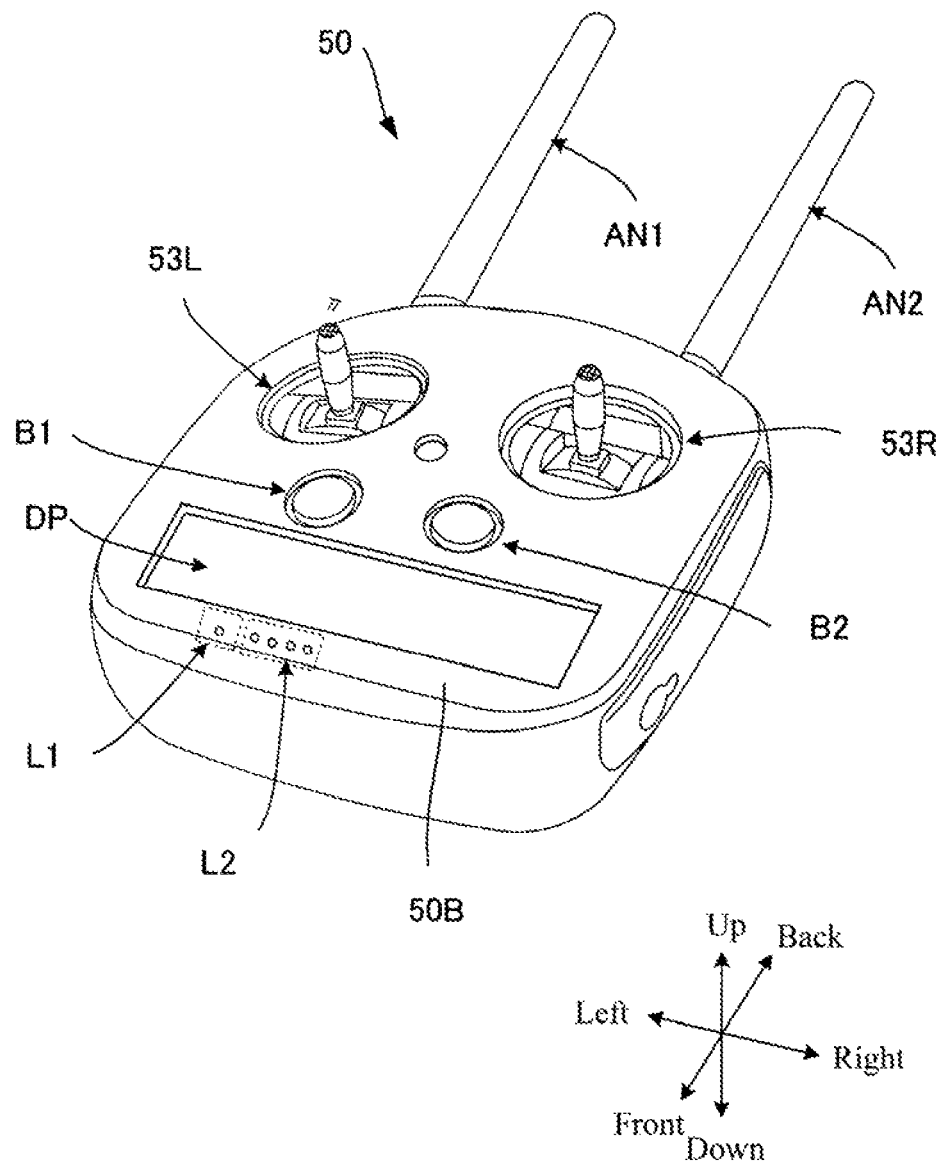
FIG. 5 is a perspective view showing an example of an appearance of a transmitter.

Next, an example of the configuration of the transmitter 50 will be described. FIG. 5 is a perspective view showing an example of an appearance of a transmitter 50. The vertical, front-rear and left-right directions of the transmitter 50 will be described in the direction of the arrow shown in FIG. 5. The transmitter 50 is used in a state of being held with both hands of, for example, a person using the transmitter 50 (hereinafter referred to as an "operator").

The transmitter 50 has, for example, a housing 50B made of a resin having a substantially rectangular parallelepiped shape (in other words, substantially box shape) having a substantially square bottom face and a height shorter than one side of the bottom face. A specific configuration of the transmitter 50 will be described later with reference to FIG. 4. A left control rod 53L and a right control rod 53R are arranged substantially at the center of the housing surface of the transmitter 50.

The left control rod 53L and the right control rod 53R are used in the operation for remotely controlling the movement of the unmanned aerial vehicle 100 by the operator (for example, in the front-rear movement, the left-right movement, the vertical movement, and the direction change of the unmanned aerial vehicle 100). In FIG. 5, the left control rod 53L and the right control rod 53R are shown in the initial state where no external force is applied from both hands of the operator. The left control rod 53L and the right control rod 53R automatically return to a predetermined position (for example, an initial position shown in FIG. 5) after the external force applied by the operator is returned.

The power supply button B1 of the transmitter 50 is arranged on the front side (in other words, the operator side) of the left control rod 53L. When the power supply button B1 is pressed once by the operator, the remaining capacity of the capacity of the battery (not shown) built in the transmitter 50 is displayed in the battery remaining amount display unit L2. When the power supply button B1 is pressed again by the operator, for example, the power supply of the transmitter 50 is turned on, and power is supplied to each part (see FIG. 6) of the transmitter 50 to be usable.

An RTH (Return To Home) button B2 is arranged in front of the right control rod 53R (in other words, the operator side). When the RTH button B2 is pressed by the operator, the transmitter 50 transmits a signal for automatically returning to the unmanned aerial vehicle 100 to a predetermined position. Accordingly, the transmitter 50 can automatically feed the unmanned aerial vehicle 100 to a predetermined position (e.g., the takeoff position where the unmanned aerial vehicle 100 is stored). The RTH button B2 can be used in the case that the operator cannot see the body of the unmanned aerial vehicle 100 in the aerial photography using the unmanned aerial vehicle 100 outdoors, or cannot operate due to the radio interference or unexpected faults.

A remote status display unit L1 and a battery remaining amount display unit L2 are arranged on the front side (in other words, the operator side) of the power supply button B1 and the RTH button B2. The remote status display unit L1 is configured using, for example, an LED (Light Emission Diode), and displays the wireless connection state between the transmitter 50 and the unmanned aerial vehicle 100. The battery remaining amount display unit L2 is configured using, for example, an LED, and displays the remaining capacity of a battery (not shown) built in the transmitter 50.

Two antennas AN 1 and AN 2 are arranged so as to protrude from the rear side of the left control rod 53L and the right control rod 53R and behind the housing 50B of the transmitter 50. The antennas AN1 and AN2 send signals generated by transmitter control unit 61 (i.e., signals used to control the movement of unmanned aerial device 100) to unmanned aerial device 100 on the basis of the operation of operator's left control rod 53L and right control rod 53R. The antennas AN1 and AN2 can cover, for example, a transmission and reception range of 2 km. In addition, antennas AN1 and AN2 can receive images or various data received from the unmanned aerial vehicle 100 when the image photographed by the photographing devices 220 and 230 of the unmanned aerial vehicle 100 wirelessly connected to the transmitter 50 or the various data acquired by the unmanned aerial vehicle 100 is transmitted from the unmanned aerial vehicle.

The display unit DP is configured to include, for example, an LCD (Crystal Liquid Display). The display unit DP displays various data. The shape, size, and arrangement position of the display unit DP are arbitrary, and are not limited to the example of FIG. 5.

Figure 6:
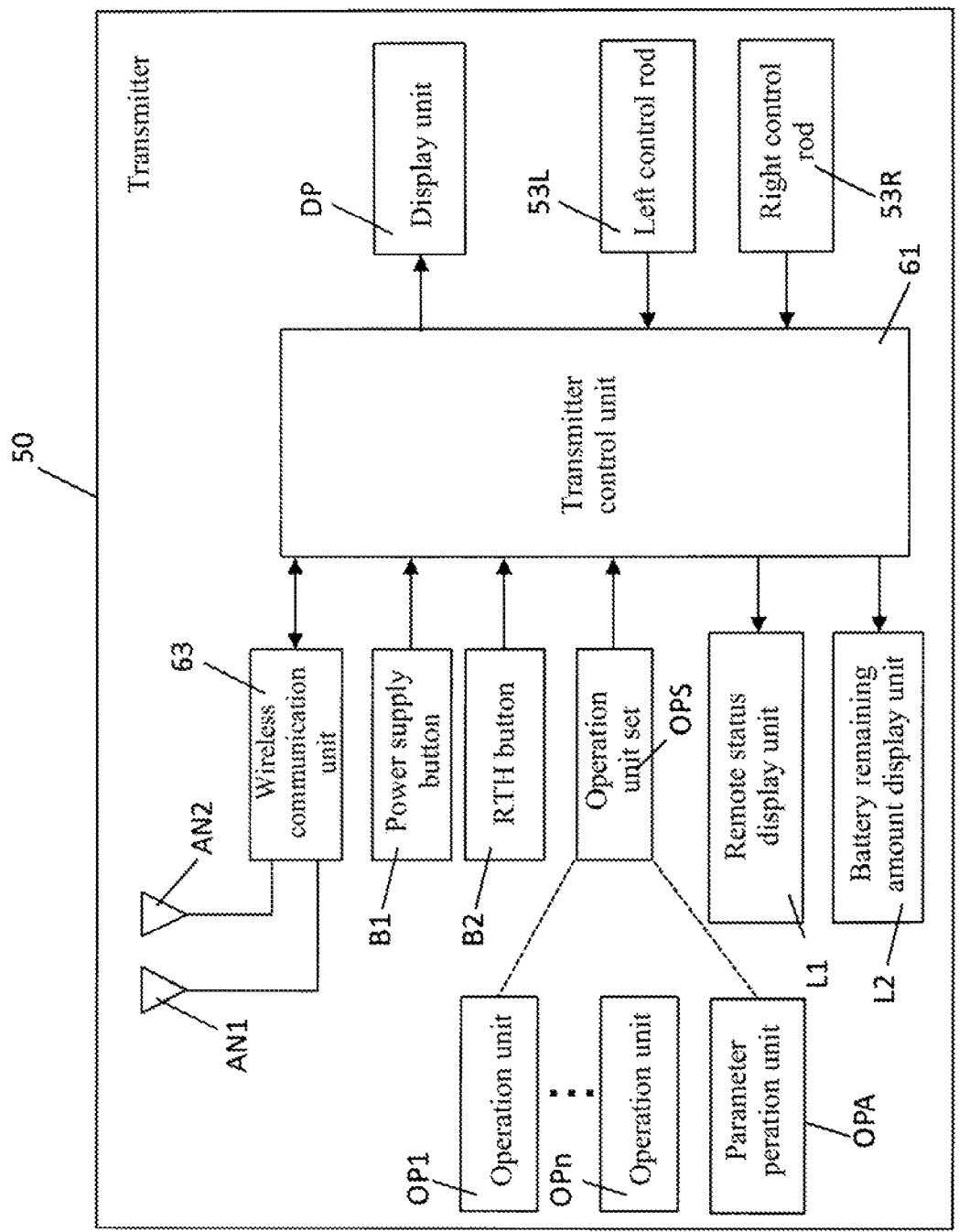
FIG. 6 is a block diagram showing an example of the hardware configuration of a transmitter.

FIG. 6 is a block diagram showing an example of the hardware configuration of a transmitter 50. The transmitter 50 includes a left control rod 53L, a right control rod 53R, a transmitter control unit 61, a wireless communication unit 63, a power supply button B1, an RTH button B2, an operation unit set OPS, a remote status display unit L1, a battery remaining amount display unit L2, and a display unit DP. The transmitter 50 is an example of a communication terminal. The wireless communication unit 63 is an example of a communication unit.

The left control rod 53L is used for an operation for remotely controlling the movement of the unmanned aerial vehicle 100, for example, by the operator's left hand. The right control rod 53R is used for an operation for remotely controlling the movement of the unmanned aerial vehicle 100, for example, by the operator's right hand. The movement of the unmanned aerial vehicle 100 is, for example, a movement in the forward direction, movement in a backward direction, a movement in the left direction, a movement in the right direction, a movement in a rising direction, a movement in a downward direction, a movement in which the unmanned aerial vehicle 100 is rotated in the left direction, and a movement in which the unmanned aerial vehicle 100 is rotated in the right direction, or a combination thereof, and the same applies hereinafter.

When the power supply button B1 is pressed once, a signal indicating that the power supply button has been pressed once is input to the transmitter control unit 61. In accordance with this signal, the transmitter control unit 61 displays the remaining capacity of the battery (not shown) built in the transmitter 50 on the battery remaining amount display unit L2. Accordingly, the operator can easily confirm the remaining capacity of the battery built in the transmitter 50. In addition, when the power supply button B1 is pressed twice, a signal indicating that the power supply button has been pressed twice is passed to the transmitter control unit 61. In accordance with this signal, the transmitter control unit 61 instructs a battery (not shown) built in the transmitter 50 to supply power to each unit in the transmitter 50. Accordingly, the operator turns on the power supply of the transmitter 50, and can easily start using the transmitter 50.

When the RTH button B2 is pressed, a signal indicating that the power supply button is has been pressed is input to the transmitter control unit 61. The transmitter control unit 61 generates a signal for automatically returning the unmanned aerial vehicle 100 to a predetermined position (for example, the take-off position of the unmanned aerial vehicle 100) in accordance with the signal, and transmits the signal to the unmanned aerial vehicle 100 via the wireless communication unit 63 and the antennas AN1 and AN2. Accordingly, the operator can automatically return (release) the unmanned aerial vehicle 100 to a predetermined position by a simple operation with respect to the transmitter 50.

The operation unit set OPS is configured by using a plurality of operation units (for example, operation unit OP 1, . . . , operation unit OPn) (n: an integer of 2 or more). The operation unit set OPS is configured by an operation unit (for example, various operation units to assist remote control of unmanned aerial vehicle 100 by transmitter 50) other than the left control lever 53L, the right control lever 53R, the power supply button B1, and the RTH button B2 shown in FIG. 4. The various operation units described here correspond to, for example, a button for instructing photographing of a still image using the photographing device 220 of the unmanned aerial vehicle 100, a button for instructing the start and end of recording of a moving image of the photographing device 220 using the unmanned aerial vehicle 100, a dial that adjusts the inclination of the universal joint 200 (see FIG. 4) in the tilt direction of the unmanned aerial vehicle 100, a button that switches the flight mode of the unmanned aerial vehicle 100, and a dial for setting the photographing device 220 of the unmanned aerial vehicle 100.

In addition, the operation unit set OPS has a parameter operation unit OPA that inputs information about an input parameter for generating a photographing interval position, a photographing position, or a flight path of the unmanned aerial vehicle 100. The parameter operation unit OPA may be formed by a stick, a button, a key, a touch panel, or the like. The parameter operation unit OPA may be formed of a left control rod 53L and a right control rod 53R. The timing of inputting each parameter included in the input parameter by the parameter operation unit OPA may be the same or different.

The input parameters include at least one of the flight range information, the information about the radius of the flight range (the radius of the flight path), the information about the center position of the flight range, the information about the radius of the subject, the height of the subject, the horizontal overlap rate, the vertical overlap rate, or the resolution information about the photographing device 220 or the photographing device 230. In addition, the input parameters may also include at least one of information about the initial altitude of the flight path, information about the end altitude of the flight path, or information about the initial photographing position of the flight course. In addition, the input parameter may include at least one of horizontal photographing interval information or vertical photographing interval information.

The parameter operation unit OPA may input at least one latitude or longitude specific value or range, and input at least one of the flight range information, the information about the radius of the flight range (the radius of the flight path), the information about the center position of the flight range, the information about the radius of the subject, or the height (for example, initial altitude and end altitude) of the subject, the horizontal overlap rate, the vertical overlap rate, and the resolution information about the photographing device 220 or the photographing device 230. The parameter operation unit OPA may input at least one latitude or longitude specific value or range, and at least one of the information of the initial altitude of the flight path, the information of the end altitude of the flight path, or the information of the initial photographing position of the flight course. By inputting specific values or ranges of latitude and longitude, the parameter operation unit OPA may input at least one of the information about the horizontal photographing intervals or the information about the upper and lower photographing intervals.

The remote status display unit L1 and the battery remaining amount display unit L2 have been described with reference to FIG. 5, so the description thereof will be omitted here.

The transmitter control unit 61 is configured to use a processor (for example, a CPU, an MPU or a DSP). The transmitter control unit 61 carries out signal processing for integrating and controlling operations of each unit of the transmitter 50, the input/output processing of data with other units, data arithmetic processing and data storage processing.

For example, the control signal of the transmitter control unit 61 is generated by the operator's left control rod 53L and the right control rod 53R, and the control is performed by the designated unmanned aerial vehicle 100. The transmitter control unit 61 transmits the generated signal to the unmanned aerial vehicle 100 via the wireless communication unit 63 and the antennas AN 1 and AN 2 to remotely control the unmanned aerial vehicle 100. Accordingly, the transmitter 50 can remotely control the movement of the unmanned aerial vehicle 100.

For example, the transmitter control unit 61 acquires map information of the map database stored by an external server or the like via the wireless communication unit 63. The transmitter control unit 61 may display the map information via the display unit DP, and select the flight range by touch operation or the like with the map information via the parameter operation unit OPA, and acquire information about the flight range and the radius of the flight range (radius of the flight path). The transmitter control unit 61 may acquire the information about the radius of the subject and the information about the height of the subject by selecting the subject by touch operation or the like with map information via the parameter operation unit OPA. In addition, the transmitter control unit 61 may calculate and acquire information about the initial altitude of the flight path and information about the end altitude of the flight path, on the basis of the information about the height of the subject. The initial altitude and the end altitude may be calculated within a range in which the end of the side surface of the subject can be photographed.

For example, the transmitter control unit 61 transmits the input parameters input by the parameter operation unit OPA to the unmanned aerial vehicle 100 via the wireless communication unit 63. The transmission timing of each parameter included in the input parameter may be the same timing or different timing.

The transmitter control unit 61 acquires information about the input parameters acquired by the parameter operation unit OPA, and sends the information to the display unit DP and the wireless communication unit 63.

The wireless communication unit 63 is connected to the two antennas AN 1 and AN 2. The wireless communication unit 63 carries out transmitting and receiving information and data using a predetermined wireless communication method (for example, Wi-Fi (a registered trademark)) with the unmanned aerial vehicle 100 via the two antennas AN 1 and AN 2. The wireless communication unit 63 transmits information about input parameters from the transmitter control unit 61 to the unmanned aerial vehicle 100.

The display unit DP may display various data processed by the transmitter control unit 61. The display unit DP displays information about the input parameters that have been input. Therefore, the operator of the transmitter 50 can confirm the content of the input parameter by referring to the display unit DP.

Still, the transmitter 50 may be connected to a display terminal (not shown) by wired or wireless connection instead of having the display unit DP. Information about input parameters may be displayed on the display terminal similarly to the display unit DP. The display terminal may be a smartphone, a tablet terminal, a PC (Personal Computer), or the like. In addition, the display terminal may input at least one of the input parameters and send the input parameters to the transmitter 50 by wire or wireless communications, and the radio communication unit 63 of the transmitter 50 may transmit the input parameters to the unmanned aerial vehicle 100.

Next, a specific calculation method of the photographing position intervals will be described.

Figure 7A:
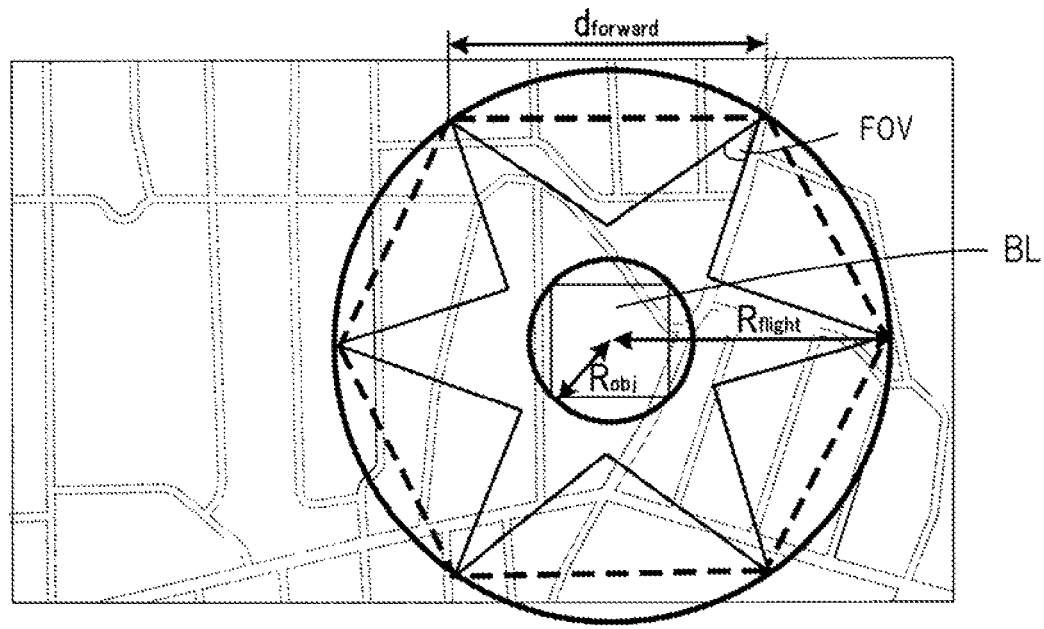
FIG. 7A is a plan view of the periphery of a subject viewed from the sky.
Figure 7B:
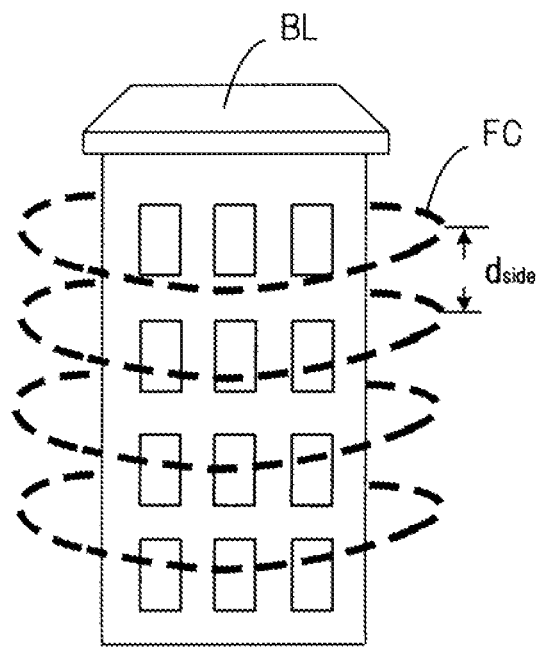
FIG. 7B is a front view of a subject viewed from the front.

FIG. 7A is a plan view of the periphery of a subject BL viewed from the sky. FIG. 7B is a front view of a subject BL viewed from the front. The front surface of the subject BL is an example of a side view of the subject BL viewed from the side (horizontal direction). In FIGS. 7A and 7B, the subject BL may be a building.

The flight path processing unit 111 may calculate the horizontal photographing intervals $d_{forward}$ indicating the photographing position intervals in the horizontal direction using (Expression 1).

Equation (1)

$$d_{forward} = (R_{flight} - R_{obj}) * FOV1 * (1 - r_{forward}) \frac{R_{flight}}{R_{obj}}$$ (Expression 1)

The meaning of each parameter in (Expression 1) is shown below.

$R_{flight}$: radius of the flight path
$R_{obj}$: radius of the subject BL (radius of the approximate circle indicating the subject BL)
FOV (Field of View) 1: horizontal field of view of photographing device 220 or photographing device 230
$r_{forward}$: horizontal overlap rate The flight path processing unit 111 may receive information (for example, latitude and longitude information) on the center position BLc of the subject BL included in the input parameter from the transmitter 50 via the communication interface 150.

The flight path processing unit 111 may calculate the radius $R_{flight}$ of the flight path on the basis of the resolution of the photographing device 220 or the photographing device 230. In this case, the flight path processing unit 111 may receive information about the resolution included in the input parameters from the transmitter 50 via the communication interface 150. The flight path processing unit 111 may receive information about the flight path radius $R_{flight}$ from the transmitter 50 via the communication interface 150 included in the input parameters. The flight path processing unit 111 may receive information about the radius $Ra_{obj}$ of the subject BL included in the input parameter from the transmitter 50 via the communication interface 150.

The information about the horizontal field of view FOV1 may be stored in the memory 160 as the information about the hardware of the unmanned aerial vehicle 100 or may be acquired from the transmitter 50. The flight path processing unit 111 may read the horizontal field of view FOV1 from the memory 160 when calculating the horizontal photographing intervals. The flight path processing unit 111 may receive information of the horizontal overlap rate $r_{forward}$ from the transmitter 50 via the communication interface 150. The horizontal overlap rate $r_{forward}$ is, for example, 90%.

Figure 8:
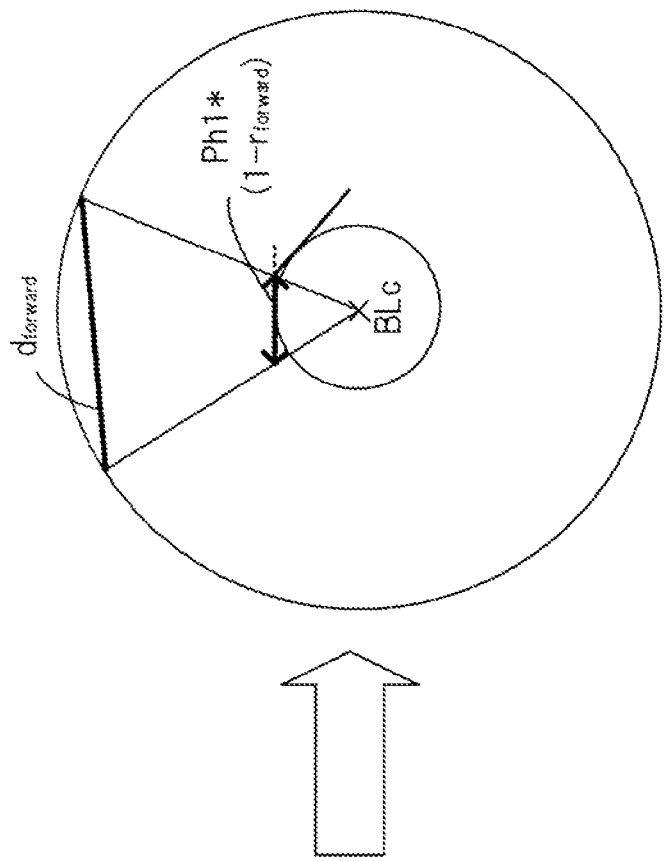
FIG. 8 is an explanatory diagram for calculating a horizontal photographing interval.
Figure 8:
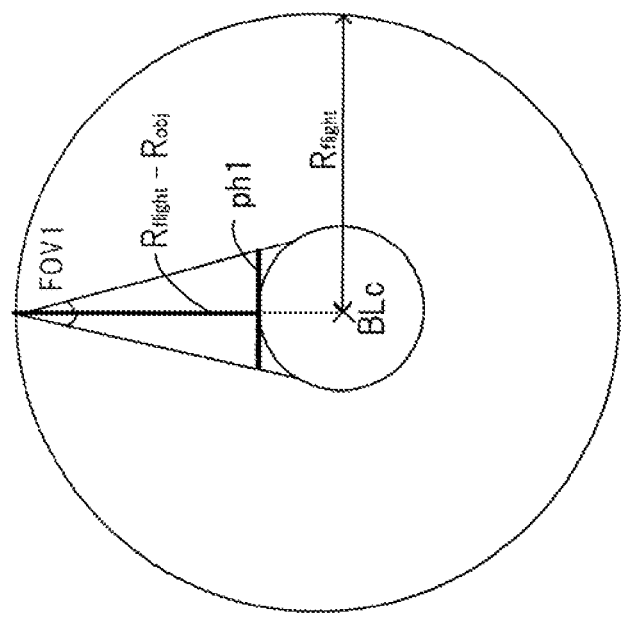

FIG. 8 is an explanatory diagram for calculating the horizontal photographing intervals $d_{forward}$ according to (Expression 1).

The horizontal field of view FOV1 can be approximated as follows using the horizontal direction component ph1 of the photography range of the photographing device 220 or the photographing device 230 and the distance to the subject BL as the photographing distance.

$$FOV1 = ph1/(R_{flight} - R_{obj})$$

Therefore, the flight path processing unit 111 calculates $(R_{flight} - R_{obj}) * FOV1 = ph1$ which is a part of (Expression 1). The field of view FOV (FOV1 in this case) is indicated by the ratio of the length (distance) as apparent from the above equation. Still, the asterisk "*" indicates a multiplication sign.

When acquiring a plurality of photographed images by the photographing device 220 or the photographing device 230, the flight path processing unit 111 may partially overlap the photography ranges of two adjacent photographed images. The flight path processing unit 111 can generate three-dimensional shape data by partially overlapping a plurality of photography ranges.

The flight path processing unit 111 is a part of the (Expression 1) (ph1*(1−horizontal overlap rate $r_{forward}$), which is a non-overlapping portion that does not overlap with the horizontal direction component of the adjacent photography range in the horizontal direction component ph1 of the photography range). Then, on the basis of the ratio of the radius $R_{flight}$ of the flight path to the radius $R_{obj}$ of the subject, the flight path processing unit 111 enlarges the non-overlapping part of the horizontal range component ph1 in the photography range to the peripheral end (flight path) of the flight range, and photographs as the horizontal photographing intervals $d_{forward}$.

Figure 9:
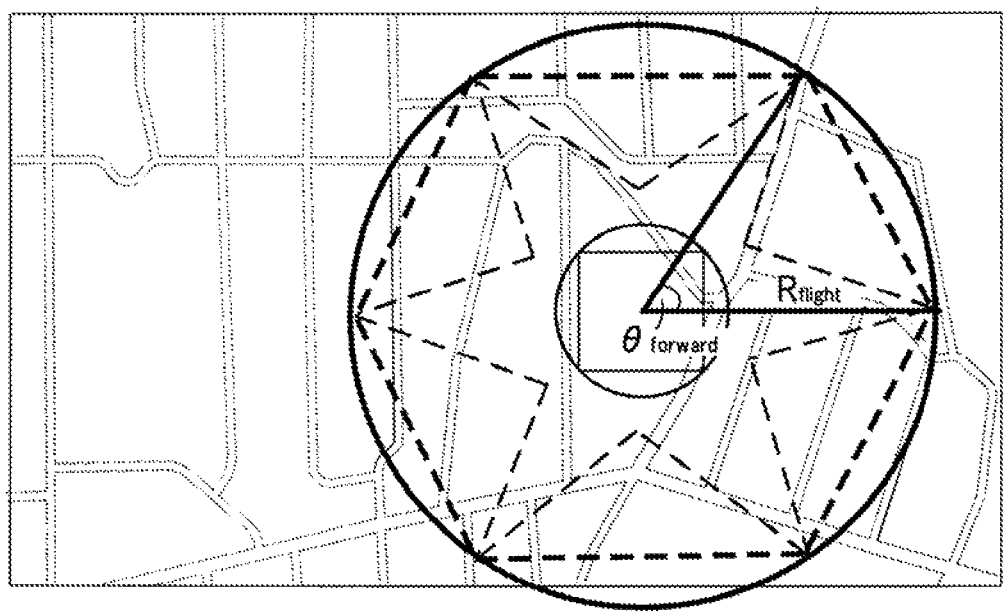
FIG. 9 is a schematic diagram showing an example of a horizontal angle.

The flight path processing unit 111 may calculate the horizontal angle $\theta_{forward}$ instead of the horizontal photographing intervals $d_{forward}$. FIG. 9 is a schematic diagram showing an example of the horizontal angle $\theta_{forward}$. The horizontal angle is calculated using (Expression 2), for example.

Equation (2)

$$\theta_{forward} = d_{forward}/R_{flight}$$ (Expression 2)

In addition, the flight path processing unit 111 may calculate the vertical photographing intervals $d_{side}$ indicating the photographing position intervals in the vertical direction using (Expression 3).

Equation (3)

$$d_{side} = (R_{flight} - R_{obj}) * FOV2 * (1 - r_{side})$$ (Expression 3)

The meaning of each parameter in (Expression 3) is shown below. Still, the explanation of the parameters used in (Expression 1) is omitted.

FOV (A field of view) 2: vertical a field of view of photographing device 220 or photographing device 230
$r_{side}$: vertical overlap rate The information about the vertical field of view FOV2 is stored in the memory 160 as hardware information. The flight path processing unit 111 may read the horizontal field of view FOV1 from the memory 160 when calculating the horizontal photographing intervals. The flight path processing unit 111 may receive information vertical overlap rate $r_{side}$ included in the input parameter from the transmitter 50 via the communication interface 150. The vertical overlap rate $r_{forward}$ is, for example, 60%.

When comparing (Expression 1) and (Expression 3), the calculation method of the vertical photographing interval $d_{side}$ is almost the same as the calculation method of the horizontal photographing interval $d_{Forward}$. But the last term $(R_{flight}/R_{obj})$ in (Expression 1) does not exist in (Expression 3). This is because the vertical direction component ph2 (not shown) of the photography range is different from the horizontal direction component ph1 of the photography range and corresponds to the distance between the photographing positions adjacent in the vertical direction as it is.

Still, in this example, the flight path processing unit 111 mainly calculates and acquires the photographing position intervals. Instead, the flight path processing unit 111 may acquire the information of the photographing position intervals from the transmitter 50 via the communication interface 150.

In this way, since the photographing position intervals include the horizontal photographing intervals, the unmanned aerial vehicle 100 can arrange the photographing position on the same flight course. Therefore, the unmanned aerial vehicle 100 can pass through a plurality of photographing positions without changing the altitude, and can stably fly. In addition, the unmanned aerial vehicle 100 can stably acquire the photographed image by going around the subject BL in the horizontal direction. In addition, since it is possible to acquire many photographed images at the same subject BL at different angles, it is possible to improve the restoration accuracy of the three-dimensional shape data over the entire circumference of the side of the subject BL.

In addition, the flight path processing unit 111 may determine the horizontal photographing intervals on the basis of at least one of the radius of the subject, the radius of the flight range, the horizontal field of view of the photographing device 220 or 230, or the horizontal overlap rate. Therefore, the unmanned aerial vehicle 100 can favorably acquire a plurality of photographed images in the horizontal direction necessary for three-dimensional restoration by taking various parameters such as the size of a specific subject and the flight range into consideration. In addition, when the intervals between the photographing positions are narrowed by increasing the horizontal overlap rate, the number of photographed images in the horizontal direction increases, and the unmanned aerial vehicle 100 can further improve the accuracy of three-dimensional reconstruction.

In addition, since the photographing position intervals include the vertical photographing intervals, the unmanned aerial vehicle 100 can acquire a photographed image at different positions in the vertical direction, that is, different altitudes. In other words, the unmanned aerial vehicle 100 can acquire photographed images at different altitudes, which are difficult to acquire in a uniform image photographed from the sky, in particular. Therefore, occurrence of a defective region at the time of generation of three-dimensional shape data can be suppressed.

In addition, the flight path processing unit 111 may determine the vertical photographing intervals on the basis of at least one of the radius of the subject, the radius of the flight range, the vertical field of view of the photographing device 220 or 230, or the vertical overlap rate. Accordingly, the unmanned aerial vehicle 100 can favorably acquire a plurality of photographed images in the vertical direction necessary for three-dimensional restoration by taking various parameters such as the size of a specific subject BL and the flight range into consideration. In addition, when the intervals between the photographing positions are narrowed, such as by increasing the vertical overlap rate, the number of photographed images in the vertical direction increases, and the unmanned aerial vehicle 100 can further improve the accuracy of three-dimensional restoration.

Next, a description will be given of a determination example of a photographing position (arrangement example) and an example of generating a flight path.

Figure 10A:
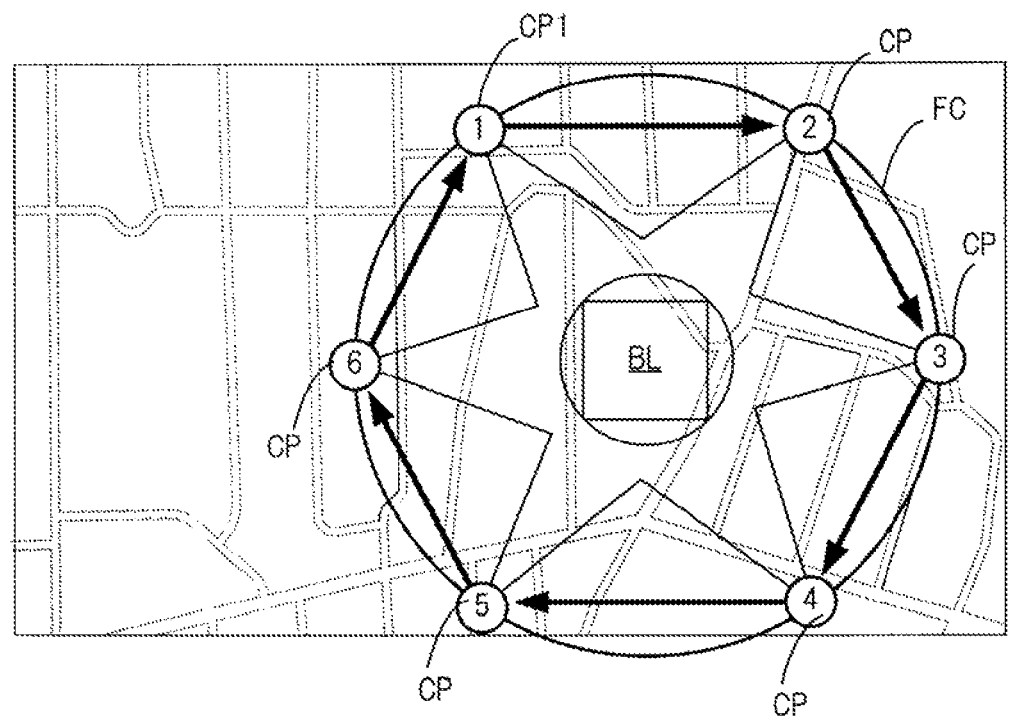
FIG. 10A is a plan view showing each photographing position and flight sequence of each photographing position in an arbitrary flight course.

FIG. 10A is a plan view showing each photographing position CP and flight sequence of each photographing position CP in an arbitrary flight course FC.

The flight path processing unit 111 calculates the photographing position CP (Waypoint) of each flight course FC in the flight path on the basis of the acquired (calculated or received) photographing position intervals. In each flight course FC, the flight path processing unit 111 may arrange the photographing position CP at equal intervals for each horizontal photographing intervals. The flight path processing unit 111 may arrange the photographing position CP at equal intervals for each vertical photographing interval between the flight courses FC adjacent in the vertical direction.

When the photographing position CP in the horizontal direction is arranged, the flight path processing unit 111 can fix one point to configure the initial photographing position CP1 (the initial photographing position CP) in the FC of any flight path, and use the initial photographing position CP1 as the base point to arrange the photographing position CP on the FC of the flight path sequentially and equidistantly according to the horizontal photographing intervals. As a result of arranging the photographing position CP at the horizontal photographing intervals, the flight path processing unit 111 may not arrange the photographing position CP one round after the flight course FC at the same position as the initial photographing position CP1. That is, it is not necessary that 360 degrees, which is one round of the flight course, be divided at equal intervals by the photographing position CP. Therefore, there may be intervals at which the horizontal photographing intervals are not equally spaced on the same flight course FC. The distance between the photographing position CP and the initial photographing position CP1 is equal to or shorter than the horizontal photographing intervals.

The flight path processing unit 111 generates a flight path FP passing through the arranged photographing positions CP. The flight path processing unit 111 may determine the highest altitude or the lowest altitude among the plurality of flight courses FC circling the side of the subject BL and having different altitudes as the initial altitude. At least one of the highest altitude or the lowest altitude may be included in the input parameter.

After passing through each photographing position CP in the flight course FC of the initial altitude, the flight path FP changes the altitude to the flight course FC immediately above or just below and the flight path FP passing through each photographing position CP in the changed flight course FC. The flight path FP may be a flight path that sequentially changes to the flight course FC just above or just below it after passing through the entire photographing position CP of one flight course FC in this way.

The flight direction at each flight course FC may be a clockwise (clockwise) direction or a counterclockwise (counterclockwise) direction. The flight direction between the plurality of flight courses FC may be an upward direction (upward direction) or a downward direction (downward direction).

Figure 10B:
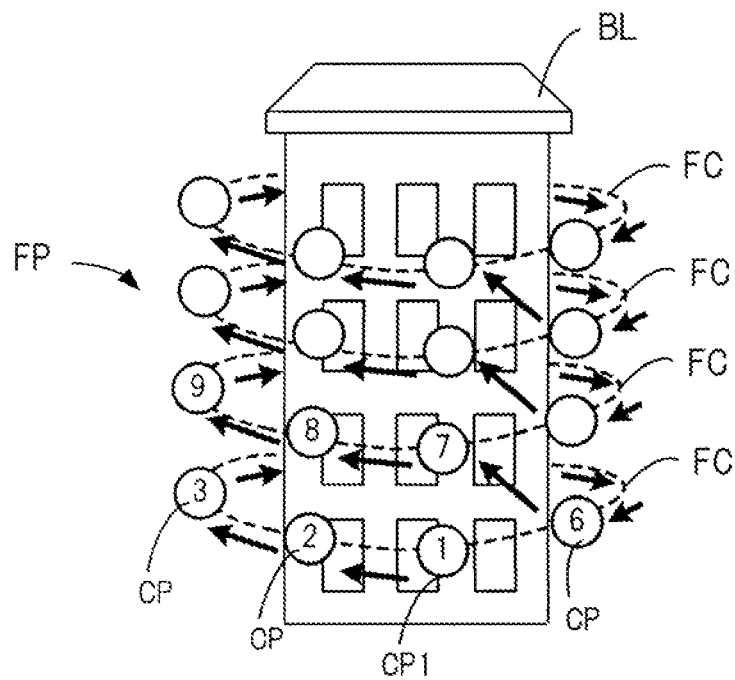
FIG. 10B is a front view showing a first example of each photographing position and flight sequence of each photographing position in each flight course.

FIG. 10B is a front view showing a first example of each photographing position CP and flight sequence of each photographing position CP in each flight course FC. In different flight courses FC, the positions (latitude and longitude) in the horizontal direction of each photographing position CP may be the same. The flight path processing unit 111, after arranging the photographing position one round at equal intervals in an arbitrary flight course, may be changed to another flight course (for example, an adjacent flight course), and an initial photographing position CP1 at this flight course may be arranged at an arbitrary position, and the arrangement of the photographing position may be continued on the basis of the horizontal photographing intervals. The flight path FP may be a flight path that passes through the photographing position CP traveling in the same direction as the flight direction in the horizontal direction at the flight course FC before the change.

In addition, the unmanned aerial vehicle 100 may make the display unit DP of the transmitter 50 display the generated flight course, flight path, and photographing position. In this case, the flight path processing unit 111 may transmit the generated flight course and flight path and the determined photographing position information to the transmitter 50 via the communication interface 150. In the transmitter 50, the transmitter control unit 61 may receive and acquire information about flight courses, flight paths, and photographing positions via the wireless communication unit 63. The transmitter control unit 61 may display display information on the basis of the information of the flight course, the flight path and the photographing position via the display unit DP.

In addition, the unmanned aerial vehicle 100 fly according to the generated flight path. The UAV control unit 110 may transmit information (passing information) including the fact that the unmanned aerial vehicle 100 has passed through one photographing position during the flight to the transmitter 50 via the communication interface 150. When the transmitter control unit 61 receives the passing information of the photographing position from the unmanned aerial vehicle 100 via the wireless communication unit 63, it is possible to change the display color of the photographing position which the unmanned aerial vehicle 100 has passed from the photographing position displayed on the display unit DP. Accordingly, the confirmer confirming the display unit DP can easily confirm the current flight position in the flight path of the unmanned aerial vehicle 100.

In addition, the unmanned aerial vehicle 100 may display display information on the basis of the flight course, the flight path, the photographing position, and the passing information of the photographing position in the display terminal connected to the transmitter 50 instead of the display unit DP.

Figure 11A:
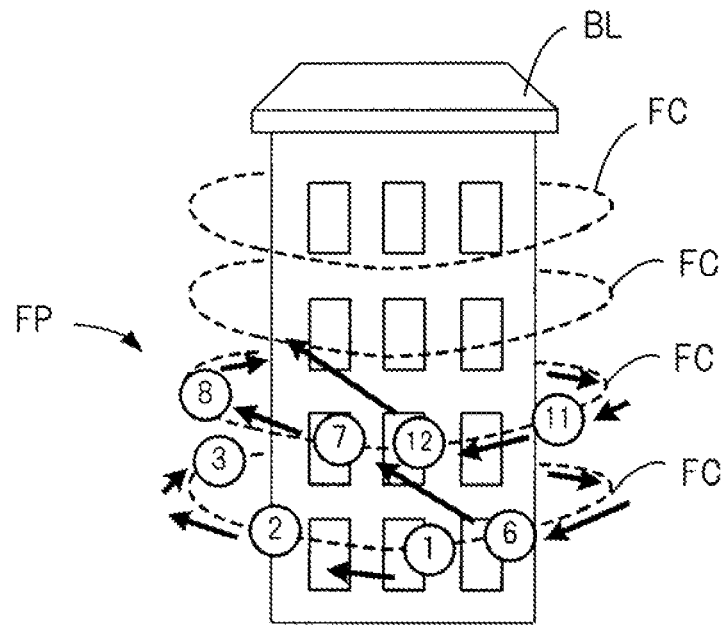
FIG. 11A is a front view showing a second example of each photographing position and flight sequence of each photographing position in each flight course.

FIG. 11A is a front view showing a second example of each photographing position CP and flight sequence of each photographing position CP in each flight course FC. In different flight courses FC, the positions (latitude and longitude) in the horizontal direction of each photographing position CP may be different. The flight path FP may be a flight path that passes through the photographing position CP traveling in the same direction as the flight direction in the horizontal direction at the flight course FC before the change.

Figure 11B:
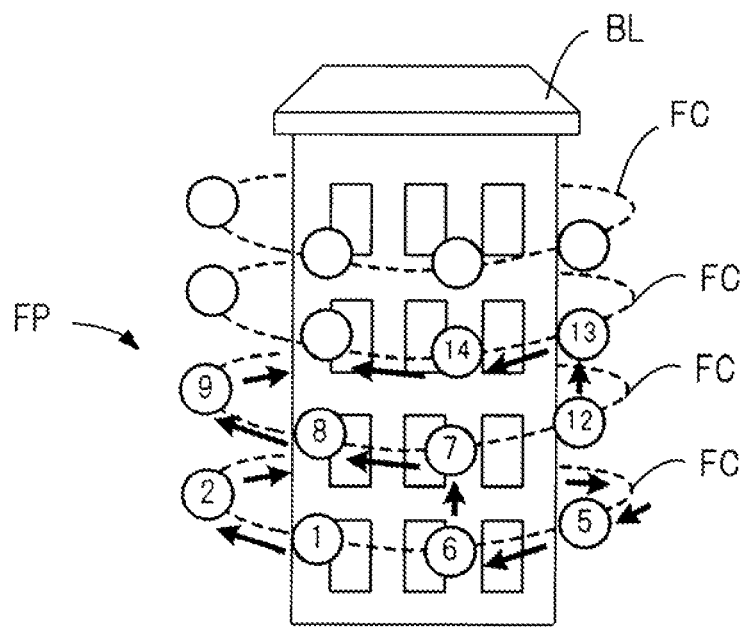
FIG. 11B is a front view showing a third example of each photographing position and flight sequence of each photographing position in each flight course.

FIG. 11B is a front view showing a third example of each photographing position CP and flight sequence of each photographing position CP in each flight course FC. The flight path processing unit 111, after arranging the photographing position CP one round at equal intervals in an arbitrary flight course FC, may change the altitude to another flight course (for example, the adjacent flight course FC) without changing the horizontal position (latitude and longitude) and an initial photographing position CP1 at this flight course FC may be arranged, and the arrangement of the photographing position CP may be continued on the basis of the horizontal photographing intervals. The flight path FP may be a flight path that passes through the photographing position CP without changing the position in the horizontal direction at the flight course FC before and after the change when changing the altitude to the flight course FC just above or below.

In this way, the flight path generated by the flight path processing unit 111 may be a flight path which changes from the first altitude to the second altitude where the second flight course FC exists after passing through each photographing position CP at the first altitude in which the first flight course FC exists. Accordingly, the unmanned aerial vehicle 100 can transition to the next altitude after the photographing at each photographing position CP at the same altitude where the flight posture is stable is completed. Therefore, the unmanned aerial vehicle 100 can image a desired image with high precision while stabilizing the flight.

In addition, by setting the horizontal photographing intervals at equal intervals by the flight path processing unit 111, the photographed images photographed at each photographing positions in the same flight course are equally divided on the side of the subject BL. Therefore, bias in a horizontal position of a plurality of photographed images for three-dimensional restoration is suppressed. Therefore, the unmanned aerial vehicle 100 can improve the restoration accuracy of the three-dimensional shape data.

In addition, by setting the vertical photographing intervals at equal intervals by the flight path processing unit 111, the photographed images photographed at each photographing positions between different flight courses are equally divided in the height direction of the subject BL. Therefore, bias in a vertical position of a plurality of photographed images for three-dimensional restoration is suppressed. Therefore, the flight path generation system 10 and the unmanned aerial vehicle 100 can improve the restoration accuracy of the three-dimensional shape data.

Next, an example of the operation of the flight path generation system 10 will be described.

Figure 12:
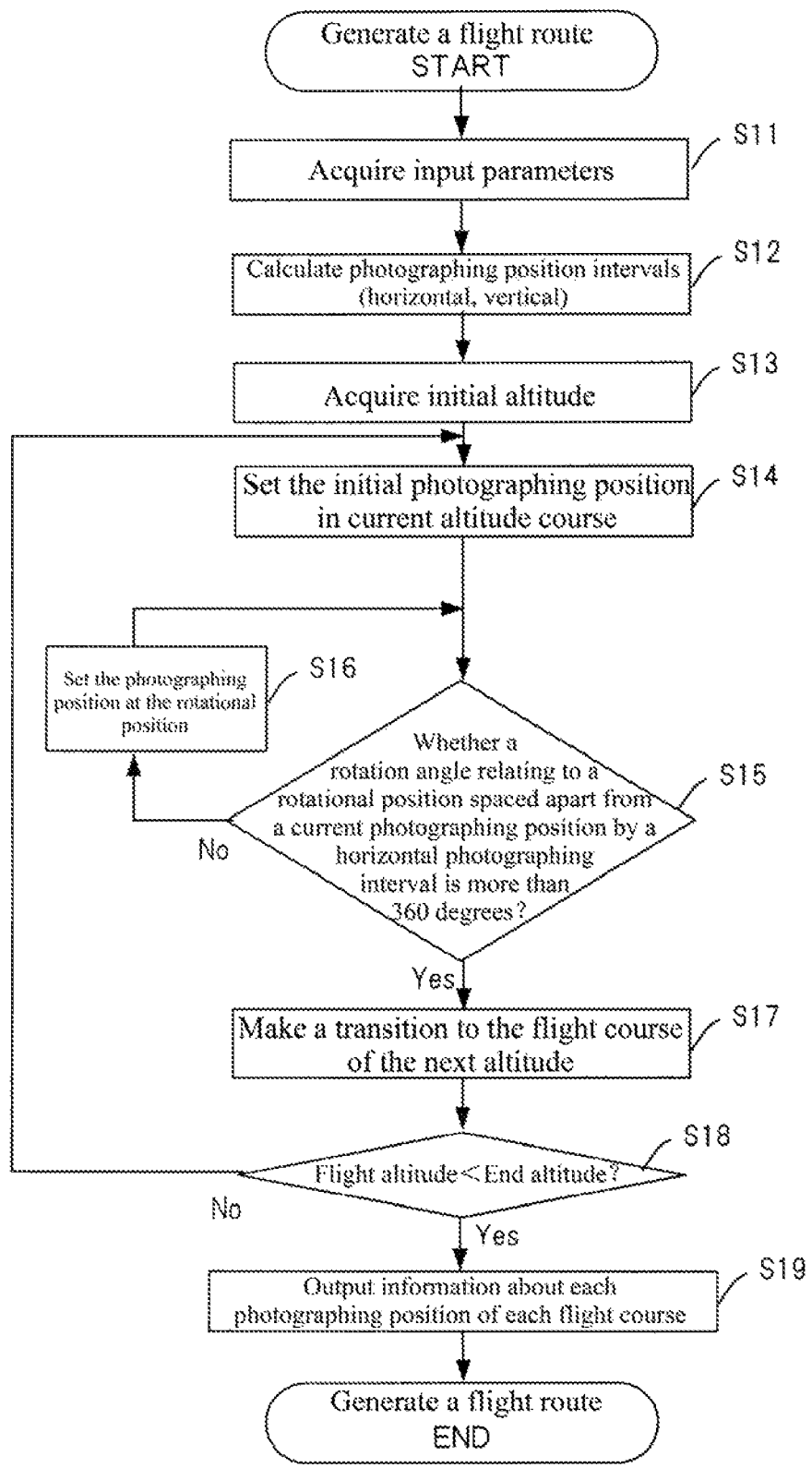
FIG. 12 is a sequence diagram showing a second example of the operation of the flight path generation system.

FIG. 12 is a flow chart showing an example of the operation of the flight path generation system 10. In FIG. 12, it is exemplified to generate a flight path that gradually lowers the flight altitude.

First, in the transmitter 50, the parameter operation unit OPA receives an input of an input parameter by a user (operator of the transmitter 50) instruction. The wireless communication unit 63 transmits the input parameters to the unmanned aerial vehicle 100.

In the unmanned aerial vehicle 100, the communication interface 150 receives and acquires input parameters from the transmitter 50, and makes the memory 160 store the input parameters (S11). The input parameters stored in the memory 160 are read out from the memory 160 when necessary and referring to by the flight path processing unit 111 or the like.

The flight path processing unit 111 calculates the photographing position intervals on the basis of the input parameters (S12). That is, the flight path processing unit 111 calculates the horizontal photographing intervals $d_{forward}$ and the vertical photographing intervals $d_{side}$.

In the unmanned aerial vehicle 100, the flight path processing unit 111 acquires the information about the initial altitude from the memory 160 (S13).

The flight path processing unit 111 arranges (sets) the initial photographing position (initial Waypoint) in the flight course (for example, the flight course at the initial altitude) of the arrangement target of the current photographing position (the target of the Waypoint addition) (S14). The initial photographing position information may be included in the input parameters input to the transmitter 50 and acquired from the memory 160. The initial photographing position may be determined by the flight path processing unit 111 on the basis of a random number.

The current photographing position (for example, the initial imaging position), is used as a base point, and a position separated from the current imaging position by the length of the horizontal photographing interval and rotated in either direction (for example, clockwise or counterclockwise) in the flight course is used as a rotation position. The flight path processing unit 111 determines whether the angle (rotation angle) between the initial photographing position and the rotational position is 360 degrees or more (S15) using the center position of the subject as a base point (rotation angle). That is, as a result of rotation, the flight path processing unit 111 determines whether or not the rotational position is a position where the rotational position has reached one or more rounds in the flight course of the arrangement target at the photographing position.

When the rotation angle is less than 360 degrees, the flight path processing unit 111 additionally arranges (sets) the photographing position at the rotational position in the same flight course as the current photographing position (S16). After the process of S16, the process proceeds to S15.

On the other hand, in the case where the rotation angle is 360 degrees or more, since the position of the photographing position in the same flight course as that of the current photographing position is finished for one round, the flight path processing unit 111 does not place the photographing position at the rotational position, and proceeds to S17.

The flight path processing unit 111 makes a transition to the flight course of the next altitude (S17). That is, the flight path processing unit 111 sets the flight course of the next altitude to be the flight course of the arrangement target of the photographing position.

The flight path processing unit 111 determines whether or not the flight altitude of the flight course after the transition is less than the end altitude (S18). The end altitude information may be included in the input parameters and may be stored in the memory 160. If the flight altitude of the flight course after the transition is equal to or higher than the end altitude, the flight path processing unit 111 sets the photographing position within the flight range in the vertical direction, so the arrangement target of the photographing position is continued, and proceeds to S14.

When the current flight altitude is less than the end altitude, the flight path processing unit 111 sets the outside of the flight range in the vertical direction as the arrangement target of the photographing position, and thus ends the additional arrangement of the photographing positions. Then, the flight path processing unit 111 outputs information about each photographing position arranged in each flight course to the memory 160 to store the information (S19).

When the flight path processing unit 111 determines the photographing positions in each flight course, it creates a flight path that passes through each photographing position. The flight path processing unit 111 outputs the generated information about the flight path to the memory 16 and stores same.

As described above, the unmanned aerial vehicle 100 acquires input parameters input by the transmitter 50. The unmanned aerial vehicle 100 can determine the photographing position intervals and the photographing position at different altitudes on the side of the subject BL on the basis of the input parameters. The unmanned aerial vehicle 100 can set a flight path that sequentially passes through the photographing position. The unmanned aerial vehicle 100 flies according to the flight path and can photograph the side surface of the subject BL by photographing the image toward the subject BL at each photographing position, that is, in the horizontal direction.

In this way, the flight path generation system 10 and the unmanned aerial vehicle 100 can perform the determination of the photographing position for acquiring a large number of images of the side surfaces of a specific subject BL, and the generation of the flight path, which cannot be obtained by simply flying over the fixed path regularly while passing through a fixed path. In addition, in order to photograph a side surface of a specific subject BL, a user does not need to hold the photographing device for photographing the side surface of the subject BL. Therefore, it is unnecessary for the user who desires to acquire the image on the side surface of the subject BL to move to the periphery of the subject BL and photograph the subject BL, thereby improving the user's convenience. In addition, by using the determined photographing position and the generated flight path, it is not necessary that the user can manually photograph the side surface of the subject BL, and the unmanned aerial vehicle 100 can be automatically photographed. In addition, the flight path generation system 10 and the unmanned aerial vehicle 100 are more likely to acquire a photographed image in a desired state (for example, a desired image photographing position of a subject, a desired image photographing size of a subject, a desired image photographing direction of a subject).

In addition, the unmanned aerial vehicle 100 can calculate the photographing position and the flight path on the basis of the flight range and the photographing position intervals without requiring the user's input of the three-dimensional spacial position (latitude, longitude, altitude) around the subject, thereby improving the user's convenience.

In addition, the unmanned aerial vehicle 100 may actually fly according to the generated flight path and photograph the image at the determined photographing position. Accordingly, since the photographing position and the generated flight path determined by the flight path processing unit 111 are used, the image of the side surface of the subject BL can be acquired easily and with high precision.

In addition, the unmanned aerial vehicle 100 may actually fly according to the generated flight path and photograph a plurality of images partially overlapping the photography range at the determined photographing position. Accordingly, the unmanned aerial vehicle 100 can acquire a photographed image necessary for three-dimensional restoration easily and with high precision.

In addition, the shape data processing unit 112 may generate three-dimensional shape data on the basis of actually photographed images. Accordingly, one system can be realized from the determination of the photographing position and generation of the flight path to the generation of three-dimensional shape data. In addition, the unmanned aerial vehicle 100 can suppress the shortage of the photographed image of the side surface of the subject BL, and can improve the restoration accuracy of the three-dimensional shape.

In the embodiments described above, the unmanned aerial vehicle performs various processes (for example, calculation of the photographing position intervals, determination of the photographing position, generation of the flight path) for generating the flight path. In some other embodiments, various processes for generating a flight path can be performed by an apparatus (for example, a transmitter) other than unmanned aerial vehicles, as described in more detail below.

Figure 13:
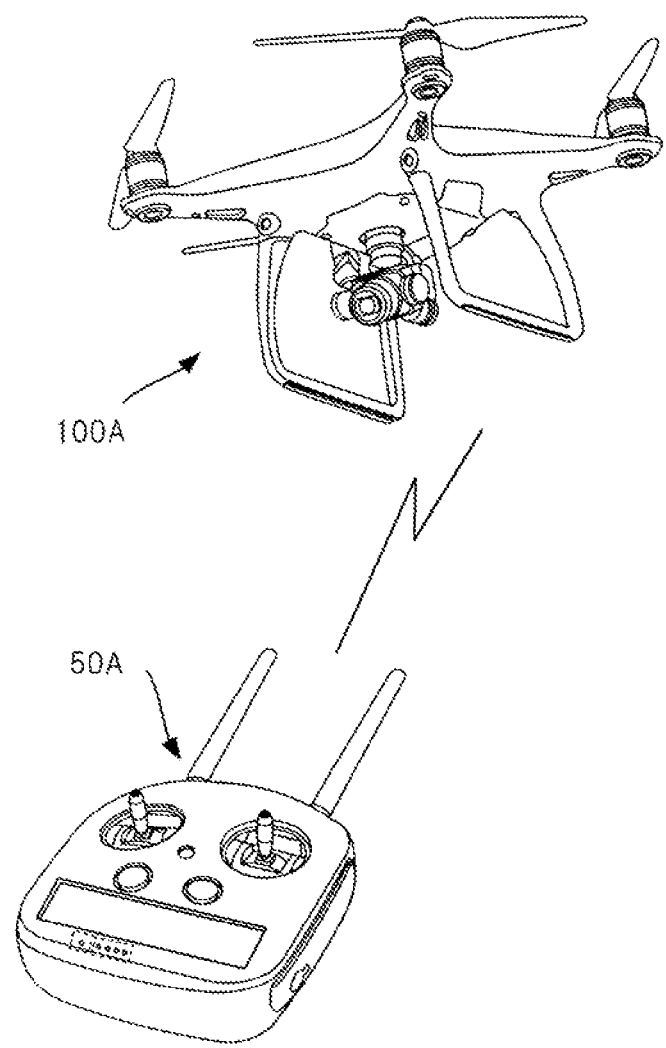
FIG. 13 is a schematic diagram showing an example of the configuration of a flight path generation system according to another embodiment.

FIG. 13 is a schematic diagram showing an example of the configuration of a flight path generation system 10A according to another embodiment. The flight path generation system 10A is provided with an unmanned aerial vehicle 100A and a transmitter 50A. The unmanned aerial vehicle 100A and the transmitter 50A can communicate with each other by means of wired communication or wireless communication (for example, a wireless LAN and Bluetooth (a registered trademark)). In the description below, a description of the features similar to those of the embodiments above will be omitted or simplified.

Figure 14:
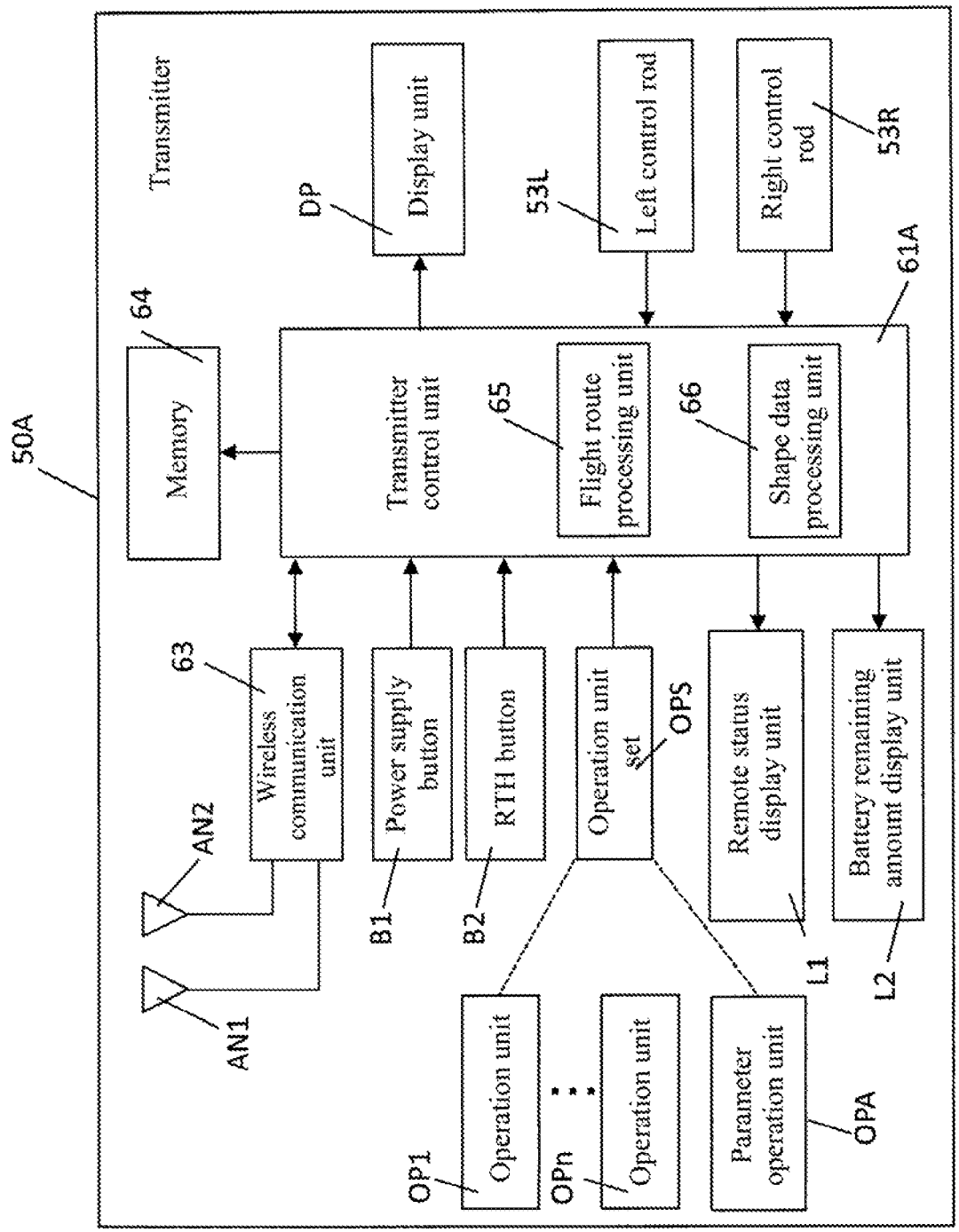
FIG. 14 is a block diagram showing an example of the hardware configuration of a transmitter.

FIG. 14 is a block diagram showing an example of the hardware configuration of a transmitter 50A. The transmitter 50A includes a transmitter control unit 61A instead of the transmitter control unit 61 in comparison with the transmitter 50. In the transmitter 50A shown in FIG. 14, the same reference numerals are given to the configurations which are the same as those in the transmitter 50 shown in FIG. 6, and the description will be omitted or simplified.

In addition to the function of the transmitter control unit 61, the transmitter control unit 61A includes a function as a flight path processing unit 65 for carrying out a process related to the flight path generation. The transmitter control unit 61A may include a function as a shape data processing unit 66 for carrying out a process related to the three-dimensional shape data. The flight path processing unit 65 is similar to the flight path processing unit 111 of the UAV control unit 110 of the unmanned aerial vehicle 100 described above. The shape data processing unit 66 is similar to the shape data processing unit 112 of the UAV control unit 110 of the unmanned aerial vehicle 100 described above. Still, the transmitter control unit 61A may not include the shape data processing unit 66.

The flight path processing unit 65 receives input parameters input to the parameter operation unit OPA. The flight path processing unit 65 makes the memory 64 store the input parameters as necessary. The flight path processing unit 65 reads at least a part of the input parameters from the memory 64 as needed (for example, when calculating the photographing position intervals, when determining the photographing position, when generating the flight path).

The memory 64 stores programs and the like necessary for controlling each unit in the transmitter 50A. In the memory 64, the UAV control unit 110 stores programs and the like necessary for executing the flight path processing unit 65 and the shape data processing unit 66. The memory 64 may be a computer-readable storage medium, and may include at least one of a static random access memory (SRAM), a dynamic random access memory (DRAM), an erasable programmable read-only memory (EPROM), an electrically erasable programmable read-only memory (EEPROM), or a flash memory such as a USB memory. The memory 64 may be provided in the transmitter 50A. The transmitter 50A may be detachably provided.

The flight path processing unit 65 may acquire (for example, calculate) the photographing position intervals, determine the photographing position, generate a flight path, and the like in the same manner as the flight path processing unit 111 described above. Detailed description will be omitted here. The input of the input parameter by the parameter operation unit OPA to the acquisition (for example, calculation) of the photographing position intervals, the determination of the photographing position, and the generation of the flight path can be performed by one device of the transmitter 50A. Therefore, when the imaging position is determined, and the flight path is generated, communication does not occur, the photographing position and the flight path can be determined without being affected by the communication environment. The flight path processing unit 65 transmits the information of the determined photographing position and the generated flight path information to the unmanned aerial vehicle 100A through the wireless communication unit 63.

The shape data processing unit 66 may receive and acquire the photographed image photographed by the unmanned aerial vehicle 100A through the wireless communication unit 63. The received photographed image may be stored in the memory 64. The shape data processing unit 66 may generate stereoscopic information (three-dimensional information, three-dimensional shape data) indicating a stereoscopic shape (three-dimensional shape) of an object (subject) on the basis of the acquired plurality of photographed images. As a method of generating three-dimensional shape data on the basis of a plurality of photographed images, a known method may be used. As a known method, for example, MVS, PMVS, SfM can be mentioned.

Figure 15:
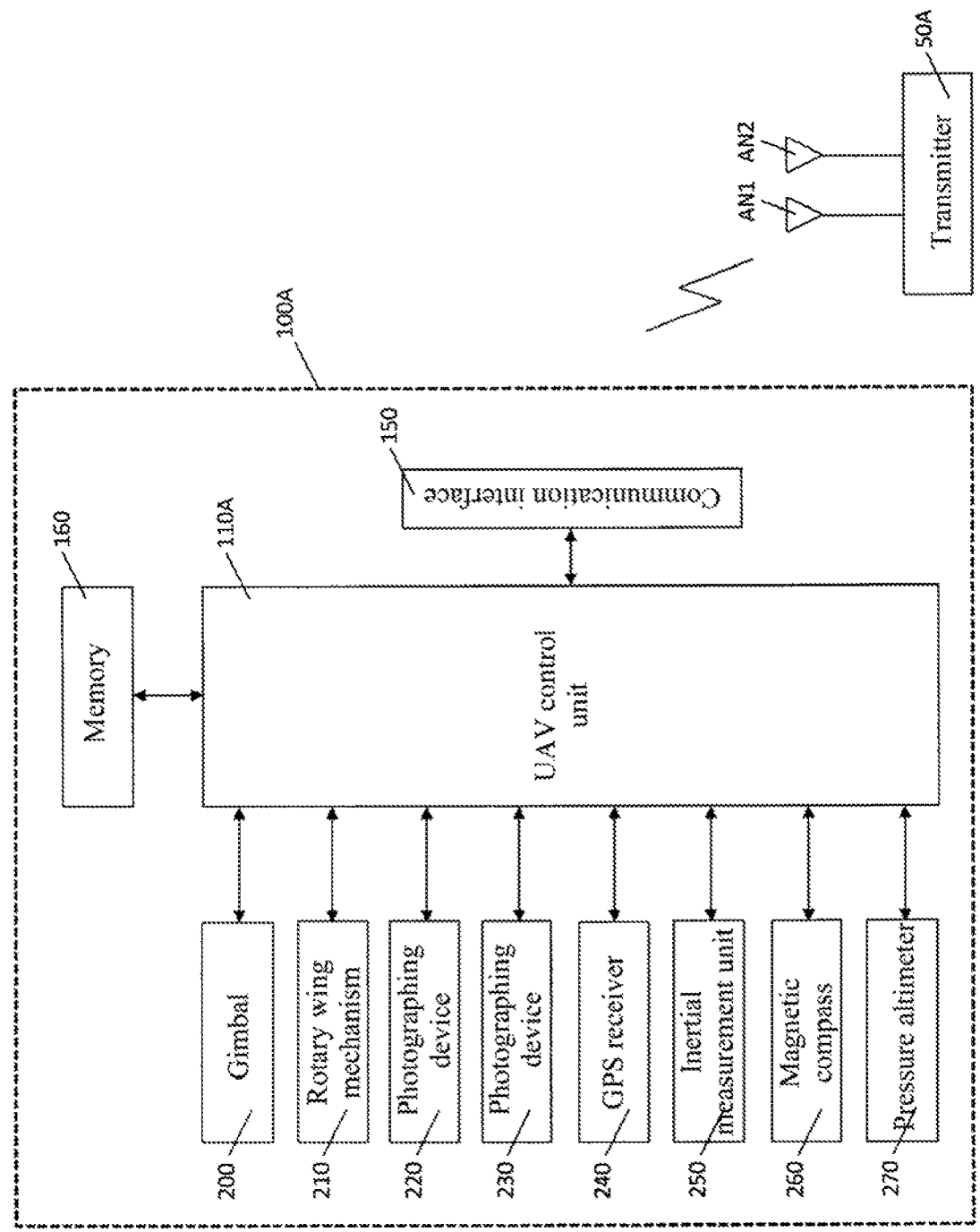
FIG. 15 is a block diagram showing an example of the hardware configuration of an unmanned aerial vehicle.

FIG. 15 is a block diagram illustrating an example of the hardware configuration of the unmanned aerial vehicle 100A. The unmanned aerial vehicle 100A includes an UAV control unit 110A instead of the UAV control unit 110 in comparison with the unmanned aerial vehicle 100. The UAV control unit 110A does not include the flight path processing unit 111 and the shape data processing unit 112. Still, the UAV control unit 110A may include a shape data processing unit 112. That is, the unmanned aerial vehicle 100A may generate three-dimensional shape data on the basis of a plurality of photographed images. In the unmanned aerial vehicle 100A shown in FIG. 15, the same reference numerals are given to the configurations which are the same as those in the unmanned aerial vehicle 100A shown in FIG. 4, and the description will be omitted or simplified.

The UAV control unit 110A may receive and acquire information about each of the photographing positions and information about the flight path from the transmitter 50A via the communication interface 150. Information about the photographing position and information about the flight path may be stored in the memory 160. The UAV control unit 110A controls the flight of the unmanned aerial vehicle 100A on the basis of the information about the photographing position acquired from the transmitter 50A and the information about the flight path, and photographs the side surface of the subject at each of the photographing positions in the flight path. Each photographed image may be stored in the memory 160. The UAV control unit 110A may transmit the photographed image photographed by the photographing device 220 or the photographing device 230 to the transmitter 50A via the communication interface 150.

In this way, in the flight path generation system 10A, the parameter operation unit OPA of the transmitter 50A inputs an input parameter. The flight path processing unit 65 determines the photographing position by using the input parameters and generates a flight path passing through the photographing position. In the unmanned aerial vehicle 100A, the UAV control unit 110A acquires the information about the determined photographing position and the information about the generated flight path from the transmitter 50A via the communication interface 150, and stores the information in the memory 160. The UAV control unit 110A controls flight according to the acquired flight path. The UAV control unit 110A makes the photographing device 220 or 230 to photograph an image (aerial photography image) at the photographing position (aerial photography position) (Waypoint) in the flight path. The photographed image (photographed image) may be used, for example, as one image for restoring the three-dimensional shape.

According to the flight path generation system 10A and the transmitter 50A, it is possible to perform the determination of the photographing position for acquiring a large number of images of the side surfaces of a specific subject BL, and the generation of the flight path, which cannot be obtained by simply flying over the fixed path while passing through a fixed path. In addition, in order to photograph a side surface of a specific subject BL, a user does not need to hold the photographing device for photographing the side surface of the subject BL. Therefore, it is unnecessary for the user who desires to acquire the image on the side surface of the subject BL to move to the periphery of the subject BL and photograph the subject BL, thereby improving the user's convenience. In addition, by using the determined photographing position and the generated flight path, it is not necessary that the user can manually photograph the side surface of the subject BL, and the unmanned aerial vehicle 100A can be automatically photographed. In addition, the flight path generation system 10A and the transmitter 50A are more likely to acquire a photographed image in a desired state (for example, a desired image photographing position of a subject, a desired image photographing size of a subject, a desired image photographing direction of a subject).

In addition, the transmitter 50A can calculate the photographing position and the flight path on the basis of the flight range and the photographing position intervals without requiring the user's input of the three-dimensional spacial position (latitude, longitude, altitude) around the subject, thereby improving the user's convenience.

In addition, the photographing position determined by the transmitter 50A and the information about the generated flight path may be set in the unmanned aerial vehicle 100A. The unmanned aerial vehicle 100A actually fly according to the generated flight path and may photograph an image at the determined photographing position. Accordingly, the unmanned aerial vehicle 100A can acquire images of the side surfaces of the subject BL easily and with high precision.

In addition, the unmanned aerial vehicle 100A may actually fly according to the generated flight path and photograph a plurality of images partially overlapping the photography range at the determined photographing position. Accordingly, the unmanned aerial vehicle 100A can acquire a photographed image necessary for three-dimensional restoration easily and with high precision. The transmitter 50A may acquire the photographed image from the unmanned aerial vehicle 100A and may generate the three-dimensional shape data.

In some embodiments described above, the transmitter performs various processes (for example, calculation of the photographing position intervals, determination of the photographing position, generation of the flight path) for generating the flight path. In some other embodiments, various types of processing for generating a flight path are performed by a communication terminal (for example, a PC) other than the transmitter.

Figure 16:
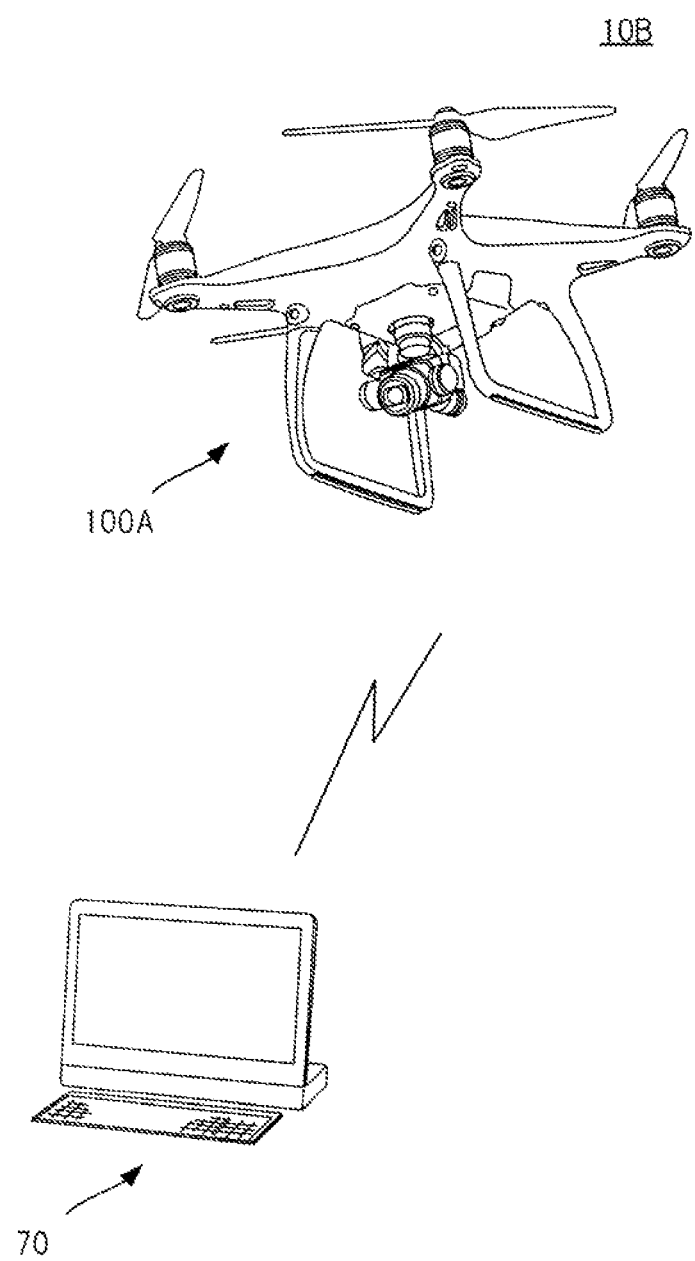
FIG. 16 is a schematic diagram showing an example of the configuration of a flight path generation system according to a third embodiment.

FIG. 16 is a schematic diagram showing an example of the configuration of a flight path generation system 10B according to another embodiment. The flight path generation system 10B includes an unmanned aerial vehicle 100A and a PC 70. The unmanned aerial vehicle 100A and the PC 70 can communicate with each other by means of wired communication or wireless communication (for example, a wireless LAN and Bluetooth (a registered trademark)).

The PC 70 may include a communication device, a memory, a processor, an input device, and a display. The PC 70 may have the functions of the parameter operation unit OPA and the flight path processing unit 65 included in the transmitter 50A described above. The PC 70 may have the function of the shape data processing unit 66 included in the transmitter 50A. A program (application) for realizing the flight path generation method may be installed in the PC 70.

According to the flight path generation system 10B and the PC70, it is possible to easily determine the photographing position and generate the flight path by using the PC 70 with high versatility without using the transmitter 50A.

Although the present disclosure has been described using the embodiments, the technical scope of the present disclosure is not limited to the scope described in the above-described embodiments. It is apparent to a person skilled in the art that various alterations or improvements are added to the above-described embodiments. It is also apparent from the description of the claims that embodiments with such alterations or improvements can be included in the technical scope of the present disclosure.

It should be noted that the order of carrying out each instance of processing, such as an operation, procedure, step, and step in a device, system, program, and method shown in claims, the description, and the drawings may be implemented in any order unless otherwise indicated by "before" and "prior," etc., and that the output of the previous instance of processing is not used in subsequent processing. For convenience, even if the operation flow in claims, description, and drawings is described using "first," "next," or the like, it does not mean that same is necessarily executed in this order.

In the embodiments described above, the unmanned aerial vehicle 100 is exemplified as the flight vehicle, but it may be an automatic flight of a manned aircraft.

In the embodiments described above, the object as the subject may be an object other than the object built on the ground, for example, an object built on the sea.

DESCRIPTION OF REFERENCE NUMERALS 10, 10A, 10B Flight path generation system
50, 50A Transmitter
50B Housing
53L Left control rod
53R Right control rod
61 Transmitter control unit
63 Wireless communication unit
64 Memory
65 Flight path processing unit
66 Shape data processing unit
70 PC
100, 100A Unmanned aerial vehicle
102 UAV main body
110, 110A UAV control unit
111 Flight path processing unit
112 Shape data processing unit
150 Communication interface
160 Memory
200 Gimbal
210 Rotary wing mechanism
220, 230 Photographing device
240 GPS receiver
250 Inertial measurement unit
260 Magnetic compass
270 Pressure altimeter
AN1, AN2 Antenna
B1 Power supply button
B2 RTH button
BL Subject
CP Photographing position
CP1 Initial photographing position
FP Flight path
FC Flight course
L1 Remote status display unit
L2 Battery remaining amount display unit
OPA Parameter operation unit
OPS Operation unit set

The invention claimed is:

1. A method for controlling a flight vehicle to photograph a subject comprising:
obtaining, by one or more processors, a flight range of the flight vehicle, an initial photographing position of the flight vehicle, and photographing position intervals, wherein one of the photographing position intervals is determined based on a ratio between a radius of the flight range and a radius of the subject;

determining, by the one or more processors, a plurality of photographing positions for the flight vehicle to photograph a subject based on the flight range of the flight vehicle, the initial photographing position, and the photographing position intervals, wherein neighboring ones of the plurality of photographing positions are spaced apart by one of the photographing position intervals;

generating a flight path of the flight vehicle that passes through the plurality of photographing positions; and controlling the flight vehicle to fly along the flight path and to photograph the subject at the plurality of photographing positions.

2. The method according to claim 1, wherein the photographing position intervals comprise a horizontal photographing position interval.

3. The method according to claim 2, further comprising:
determining the horizontal photographing position interval based on at least one of a radius of the subject, a radius of the flight range, a field of view of a photographing device mounted on the flight vehicle, or a horizontal overlap rate which is an overlap rate between photography ranges of the flight vehicle at adjacent ones of the photographing positions.

4. The method according to claim 1, wherein the photographing position intervals comprise a vertical photographing position interval.

5. The method according to claim 4, further comprising:
determining the vertical photographing position interval based on at least one of a radius of the subject, a radius of the flight range, a field of view of a photographing device mounted on the flight vehicle, or a vertical overlap rate which is an overlap rate between photography ranges of the flight vehicle at adjacent photographing altitudes.

6. The method according to claim 1, wherein the flight path includes a first segment at a first altitude and a second segment at a second altitude.

7. The method according to claim 6, further comprising:
photographing a side surface of the subject with the flight vehicle at each of the photographing positions in the flight path to acquire a plurality of photographed images.

8. The method according to claim 7, wherein photography ranges of the photographed images photographed at neighboring ones of the photographing positions are partially overlapped.

9. The method according to claim 8, further comprising:
generating three-dimensional shape data of the subject based on the plurality of photographed images.

10. A flight vehicle comprising:
a photographing device; and
a processor configured to:
obtain a flight range of the flight vehicle, an initial photographing position of the flight vehicle, and photographing position intervals, wherein one of the photographing position intervals is determined based on a ratio between a radius of the flight range and a radius of the subject;

determine a plurality of photographing positions to photograph a subject based on the flight range of the flight vehicle, the initial photographing position, and the photographing position intervals, wherein neighboring ones of the plurality of photographing positions are spaced apart by one of the photographing position intervals;

generate a flight path of the flight vehicle that passes through the photographing positions; and control the flight vehicle to fly along the flight path and to photograph the subject at the plurality of photographing positions.

11. The flight vehicle according to claim 10, wherein the photographing position intervals comprise a horizontal photographing position interval.

12. The flight vehicle according to claim 11, wherein the processor is further configured to determine the horizontal photographing position interval based on at least one of a radius of the subject, a radius of the flight range, a field of view of the photographing device, or a horizontal overlap rate which is an overlap rate between photography ranges of the flight vehicle at adjacent ones of the photographing positions.

13. The flight vehicle according to claim 10, wherein the photographing position intervals comprise a vertical photographing position interval.

14. The flight vehicle according to claim 13, wherein the processor is further configured to determine the vertical photographing position interval based on at least one of a radius of the subject, a radius of the flight range, a field of view of the photographing device, or a vertical overlap rate which is an overlap rate between photography ranges of the flight vehicle at adjacent photographing altitudes.

15. The flight vehicle according to claim 10, wherein the flight path includes a first segment at a first altitude and a second segment at a second altitude.

16. The flight vehicle according to claim 15, wherein the photographing device is configured to photograph a side surface of the subject at each of the photographing positions in the flight path to acquire a plurality of photographed images.

17. The flight vehicle according to claim 16, wherein photography ranges of the photographed images photographed at neighboring ones of the photographing positions are partially overlapped.

18. The flight vehicle according to claim 17, wherein the processor is further configured to generate three-dimensional shape data of the subject based on the plurality of photographed images.

19. The flight vehicle according to claim 10, wherein the processor is further configured to acquire at least one of:
information about a radius of the subject,
information about a radius of the flight range,
information about a horizontal overlap rate between photography ranges of the flight vehicle at adjacent ones of the photographing positions, or
information about a vertical overlap rate between photography ranges of the flight vehicle at adjacent photographing altitudes.

20. A computer-readable storage medium storing a program that, when executed by a processor, causes the processor to:
obtain a flight range of a flight vehicle, an initial photographing position of the flight vehicle, and photographing position intervals, wherein one of the photographing position intervals is determined based on a ratio between a radius of the flight range and a radius of the subject;

determine a plurality of photographing positions for the flight vehicle to photograph a subject based on the flight range of the flight vehicle, the initial photographing position, and the photographing position intervals, wherein neighboring ones of the plurality of photographing positions are spaced apart by one of the photographing position intervals;
generate a flight path of the flight vehicle that passes through the photographing positions; and
control the flight vehicle to fly along the flight path and to photograph the subject at the plurality of photographing positions.

* * * * *